United States Patent
Mori

(10) Patent No.: US 7,519,345 B2
(45) Date of Patent: Apr. 14, 2009

(54) RECEIVING APPARATUS AND RECEIVING METHOD, AND PROGRAM

(75) Inventor: Nobuyuki Mori, Tokyo (JP)

(73) Assignee: Sony Corporation (JP)

( * ) Notice: Subject to any disclaimer, the term of this patent is extended or adjusted under 35 U.S.C. 154(b) by 600 days.

(21) Appl. No.: 11/035,897

(22) Filed: Jan. 14, 2005

(65) Prior Publication Data

US 2005/0245298 A1    Nov. 3, 2005

(30) Foreign Application Priority Data

Jan. 14, 2004    (JP) ............................ P2004-006756

(51) Int. Cl.
    H04B 7/00    (2006.01)
(52) U.S. Cl. .................... 455/277.1; 455/101; 455/134; 455/150.1; 455/272; 455/277.2
(58) Field of Classification Search ................ 455/101, 455/134, 135, 150.1, 272, 277.1, 277.2
    See application file for complete search history.

(56) References Cited

U.S. PATENT DOCUMENTS

| | | | | |
|---|---|---|---|---|
| 5,561,673 A * | 10/1996 | Takai et al. | .................. | 714/708 |
| 5,940,454 A * | 8/1999 | McNicol et al. | ............. | 375/347 |
| 6,002,672 A * | 12/1999 | Todd | ........................... | 370/252 |
| 6,029,057 A * | 2/2000 | Paatelma et al. | .......... | 455/277.2 |
| 6,721,550 B1 * | 4/2004 | Okada et al. | ............. | 455/277.1 |
| 6,907,094 B2 * | 6/2005 | Matsui et al. | ................ | 375/347 |
| 6,985,544 B2 * | 1/2006 | Matsui et al. | ................ | 375/347 |
| 7,035,612 B2 * | 4/2006 | Kishimoto et al. | ........ | 455/277.1 |

FOREIGN PATENT DOCUMENTS

| | | |
|---|---|---|
| EP | 1 239 609 | 12/2005 |
| JP | 03-076323 A | 4/1991 |
| JP | 06-334636 A | 12/1994 |
| JP | 7-307723 A | 11/1995 |
| JP | 09-130447 A | 5/1997 |
| JP | 2000-041020 A | 2/2000 |
| JP | 2002-237771 A | 8/2002 |
| JP | 2002-300098 A | 10/2002 |
| JP | 2003-283399 A | 10/2003 |

* cited by examiner

*Primary Examiner*—Matthew D Anderson
*Assistant Examiner*—April S Guzman
(74) *Attorney, Agent, or Firm*—Lerner, David, Littenberg, Krumholz & Mentlik, LLP

(57) ABSTRACT

A receiving apparatus according to the present invention includes an obtaining unit operable to obtain the reception level of a first radio wave received via one antenna of first and second antennas, and a transmission rate representing the transmission speed of the first radio wave, the transmission rate being included in the first radio wave and being set by a transmitting apparatus transmitting the first radio wave; a storing unit operable to store, for each of a plurality of transmission rates, a range of signal reception levels in which a packet error rate is substantially 0%; a determining unit operable to determine whether to switch from the one antenna to another antenna based on the reception level of the first radio wave and a first range of reception levels stored in the storing unit which correspond to the transmission rate of the first radio wave; and a controlling unit operable to control switching of the antennas when the determining unit determines to switch from the one antenna to the another antenna so as to receive via the another antenna a second radio wave of a packet different from the packet of the first radio wave.

9 Claims, 15 Drawing Sheets

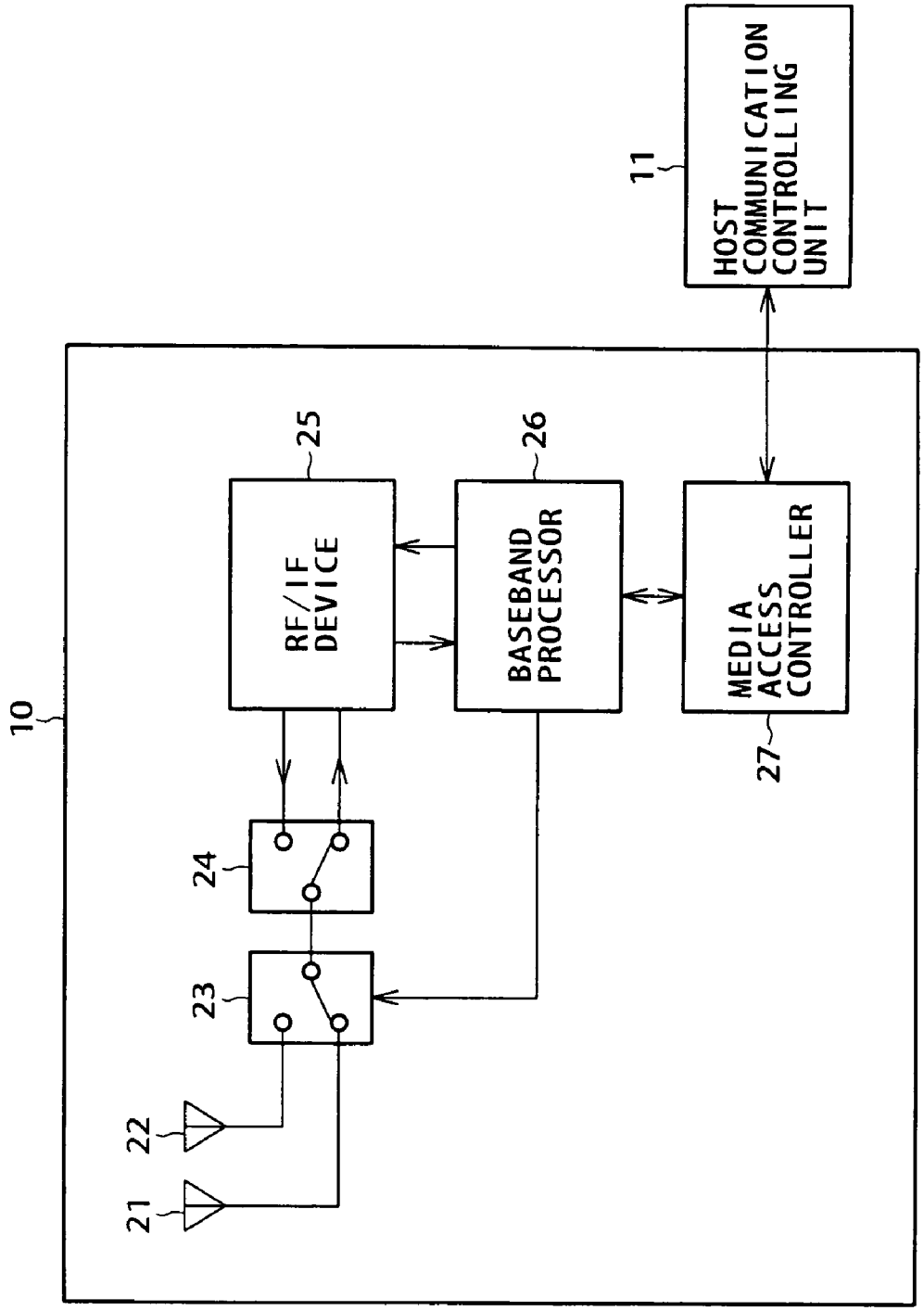

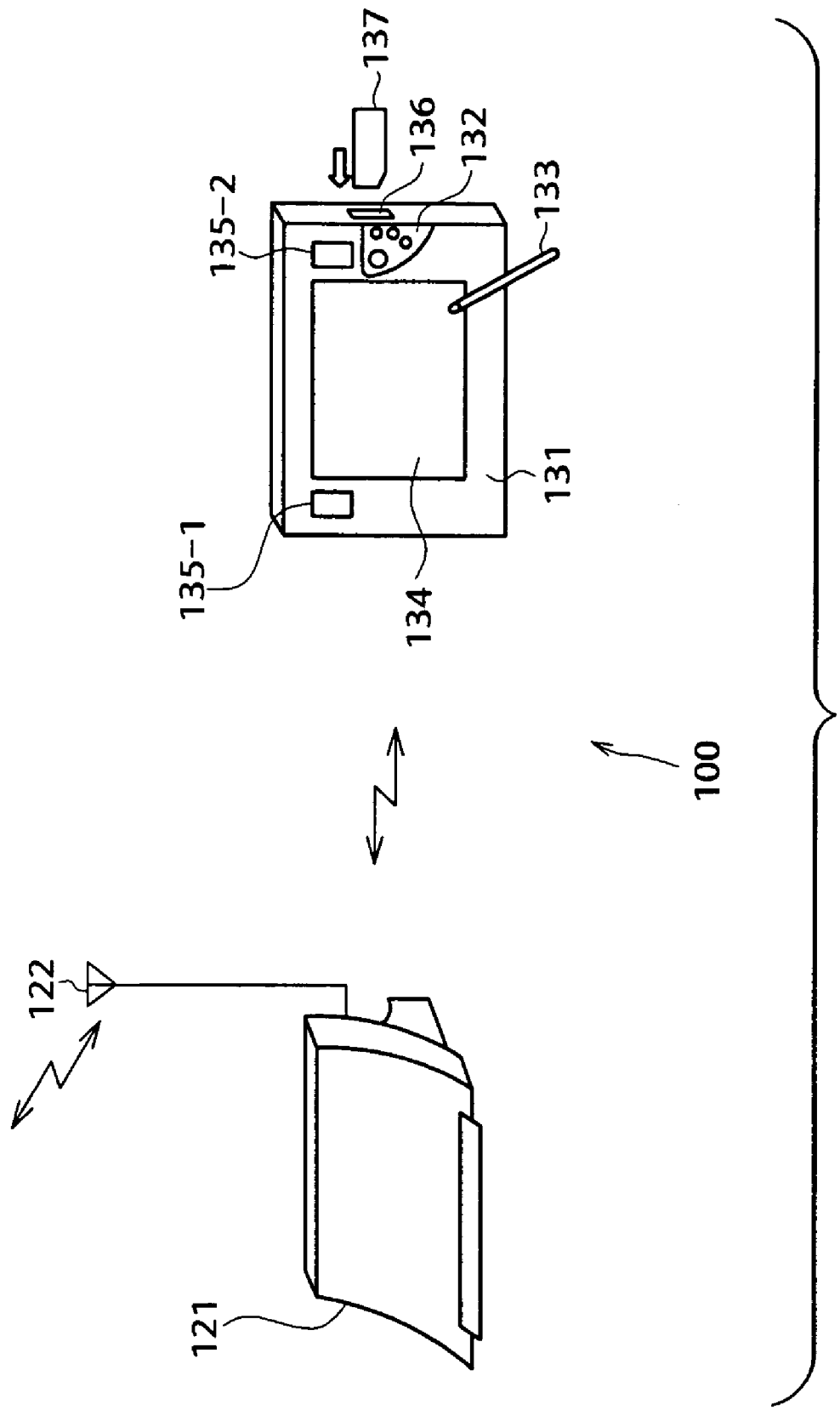

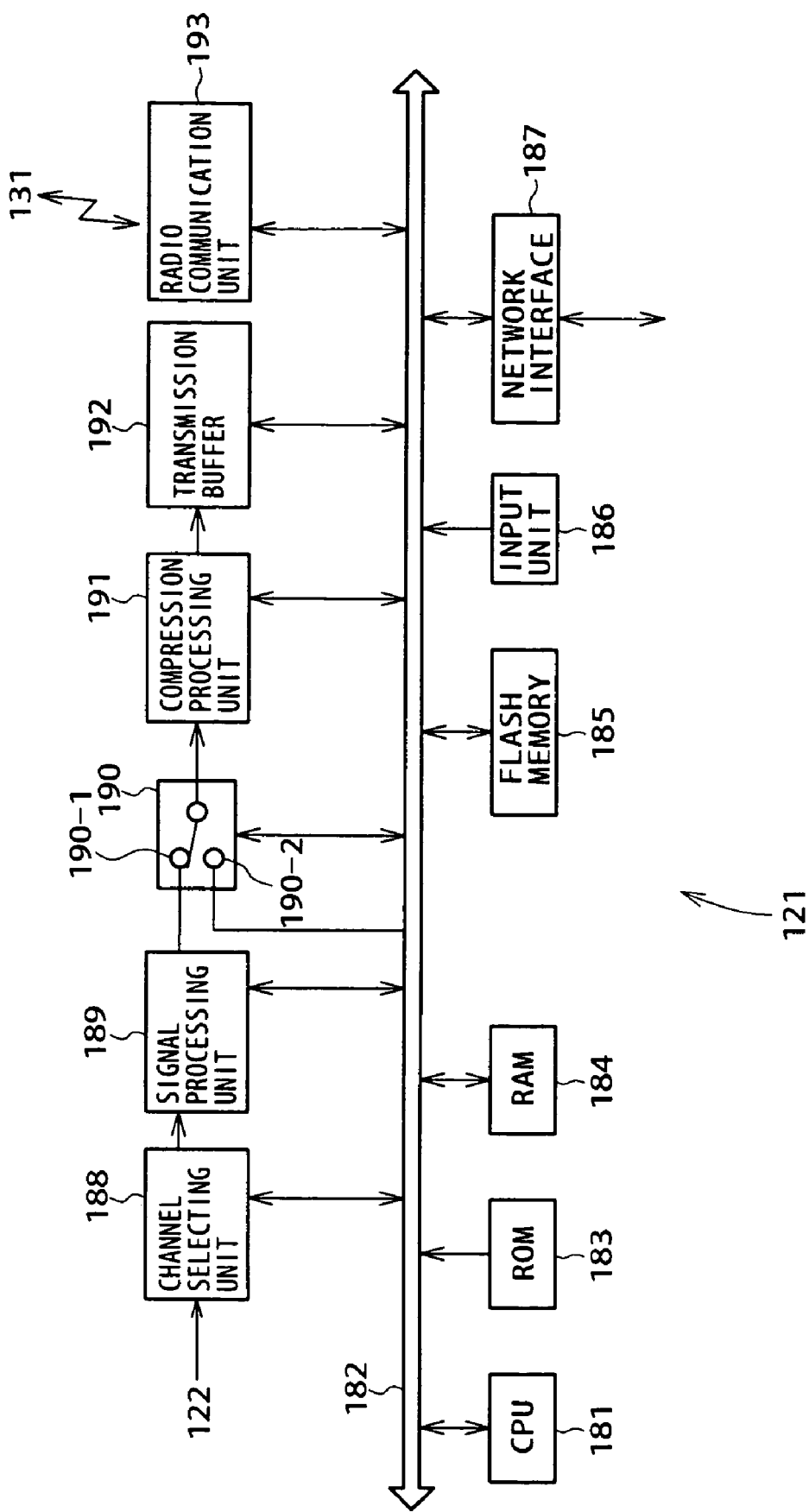

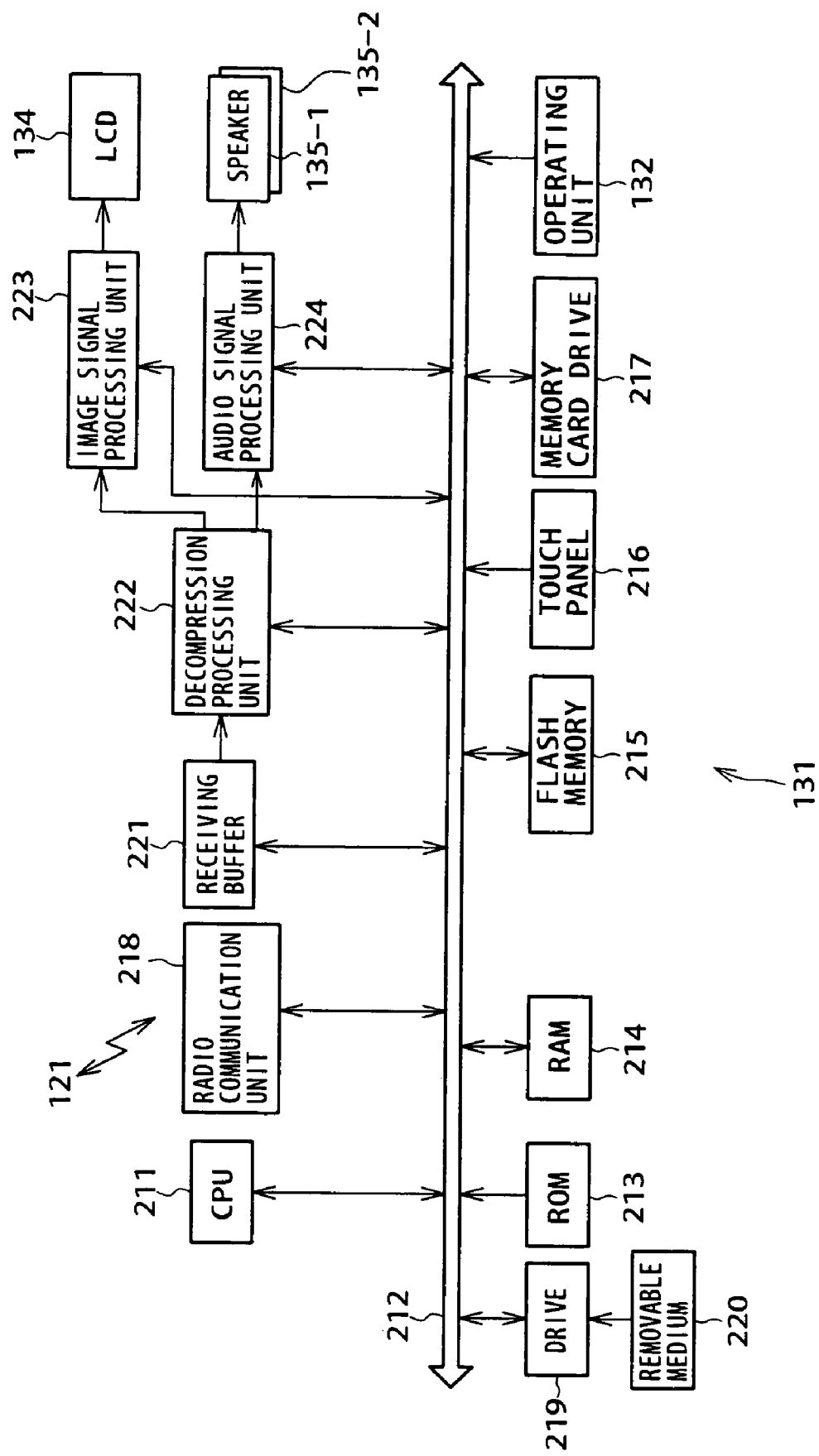

| TRANSMISSION RATE | MINIMUM VALUE | MAXIMUM VALUE |
|---|---|---|
| 54Mbps | −80dBm | −30dBm |
| 36Mbps | −90dBm | −20dBm |

380

F I G. 1 4
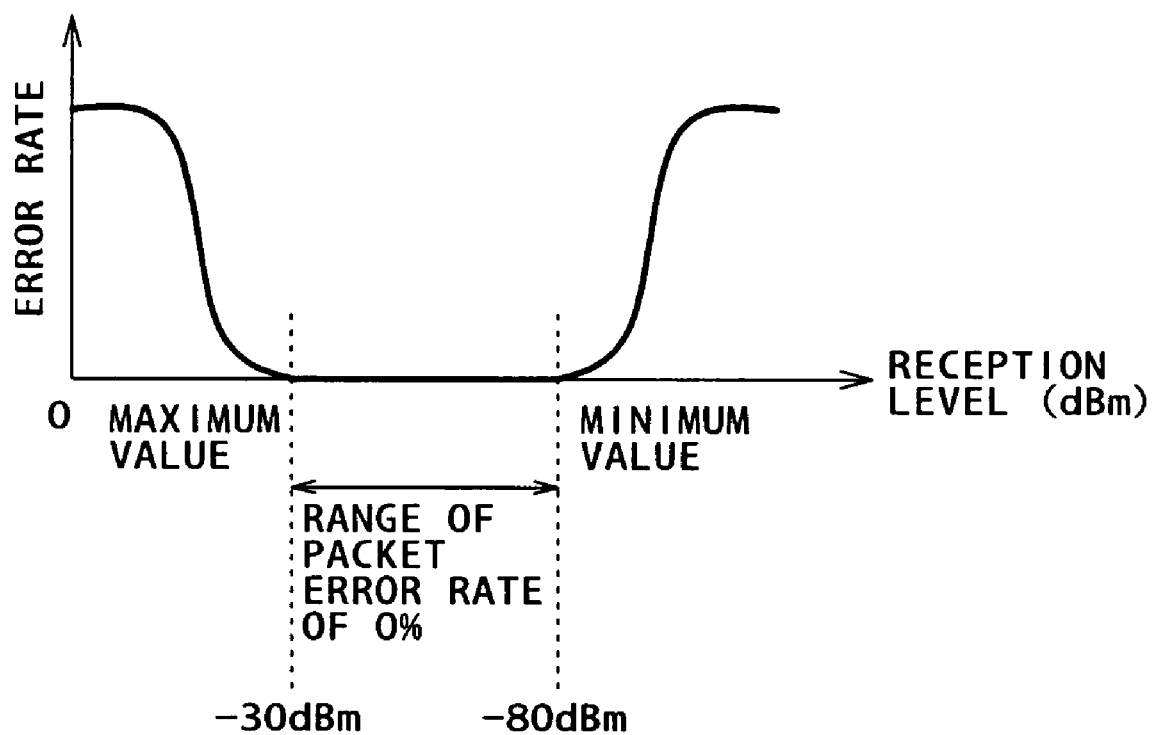

F I G. 1 5
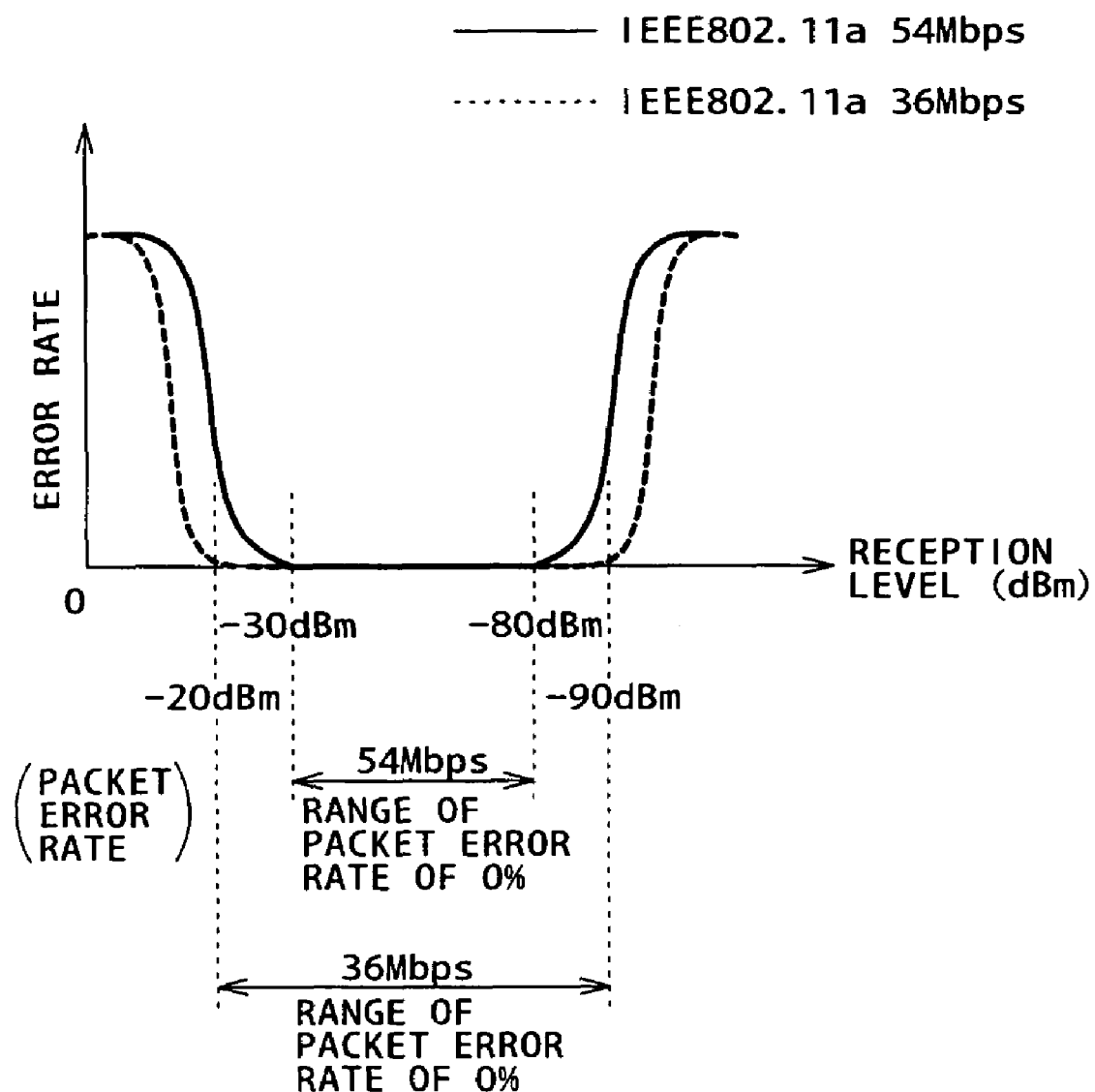

RECEIVING APPARATUS AND RECEIVING METHOD, AND PROGRAM

CROSS-REFERENCE TO RELATED APPLICATIONS

The present application claims priority from Japanese Application No. 2004-006756 filed Jan. 14, 2004, the disclosure of which is hereby incorporated by reference herein.

BACKGROUND OF THE INVENTION

The present invention relates to a receiving apparatus and a receiving method, and a program. More particularly, the invention relates to a receiving apparatus and a receiving method, and a program that can perform antenna control easily and optimally in receiving a radio wave via one of two antennas.

A conventional wireless LAN (Local Area Network) device that controls diversity antennas will be described with reference to FIG. 1.

The wireless LAN device 10 is connected to a host communication controlling unit 11 incorporated in a personal computer. The wireless LAN device 10 has an antenna 21, an antenna 22, a diversity antenna changing switch 23, a transmission/reception changing switch 24, an RF (Radio Frequency)/IF (Intermediate Frequency) device 25, a baseband processor 26, and a media access controller 27.

The diversity antenna changing switch 23 performs switching between the antenna 21 and the antenna 22 during a preamble signal period of each received packet to receive a preamble signal via each of the antennas.

The RF/IF device 25 obtains an RF signal including a component in a predetermined frequency band of the signal received by each of the antennas. In addition, the RF/IF device 25 obtains an IF level detection signal by subjecting the RF signal to amplification, frequency conversion, and band limitation, and then supplies the IF level detection signal to the baseband processor 26. The baseband processor 26 compares the IF levels (signal strengths) of the antennas with each other, and controls the diversity antenna changing switch 23 to select the antenna having the higher level. Thereby, after the preamble signal period of the received packet, data is received by the antenna selected by the diversity antenna changing switch 23.

Thus, the wireless LAN device 10 determines the signal strengths of the packet received by the two antennas to receive the packet by the antenna having the higher IF level.

Further, for example, Japanese Patent Laid-Open No. 2000-41020 discloses the provision of two sets of circuits for separating an OFDM (Orthogonal Frequency Division Multiplexing) high frequency signal into a signal of each of carrier waves forming the OFDM signal and selection by a synthesizing circuit of a signal of greater amplitude from signals output from the two sets of circuits.

However, since the wireless LAN device 10 shown in FIG. 1 checks the signal strengths of each packet received by the two antennas, a high speed switch for changing the antennas is required, and control of the switch needs to be performed steadily at high speed, thus imposing a heavy load on a control device.

Further, for example, a length of a part (length of a preamble and length of a header) other than a data part in IEEE (Institute of Electrical and Electronics Engineers) 802.11a and IEEE802.11g using OFDM modulation is 16 µs, which is very short as compared with IEEE802.11b using CCK (Complementary Code Keying) in which a length of a part (length of a preamble and length of a header) other than a data part is 192 µs. When the preamble length is short as in IEEE802.11a, it is difficult to check the levels of both antennas during the preamble signal period with the wireless LAN device 10 shown in FIG. 1 and the method disclosed in Japanese Patent Laid-Open No. 2000-41020.

Further, the wireless LAN device 10 shown in FIG. 1 and the method disclosed in Japanese Patent Laid-Open No. 2000-41020 select a signal of high reception level at all times. However, when the reception level becomes higher than a certain level, distortion may occur in a receiving circuit such as, for example, an LNA (Low Noise Amplifier) incorporated in the RF/IF device 25, so that a packet error may occur. That is, it is not necessarily desirable to select an antenna having a high reception level when a wireless LAN device at the other end of the communication is situated nearby.

SUMMARY OF THE INVENTION

The present invention has been made in view of the above, and it is an object of the present invention to control diversity antennas easily and optimally.

According to an aspect of the present invention, there is provided a receiving apparatus for receiving radio waves via first and second antennas. The receiving apparatus includes an obtaining unit operable to obtain a reception level of a first radio wave received via one antenna of the first and second antennas, and a transmission rate representing a transmission speed of the first radio wave, the transmission rate being included in the first radio wave and being set by a transmitting apparatus transmitting the first radio wave; a storing unit operable to store, for each of a plurality of transmission rates, a range of reception levels in which a packet error rate is substantially 0%; a determining unit operable to determine whether to switch from the one antenna to another antenna based on the reception level of the first radio wave and a first range of reception levels stored in the storing unit which correspond to the transmission rate of the first radio wave; and a controlling unit operable to control switching of the antennas when the determining unit determines to switch from the one antenna to the another antenna so as to receive via the another antenna a second radio wave of a packet different from a packet of the first radio wave.

According to another aspect of the present invention, there is provided a method for receiving radio waves via first and second antennas, the receiving method including obtaining a reception level of a first radio wave received via one antenna of the first and second antennas, and a transmission rate representing a transmission speed of the first radio wave, the transmission rate being included in the first radio wave and being set by a transmitting apparatus transmitting the first radio wave; determining whether to switch from the one antenna to another antenna based on the reception level of the first radio wave and a range of reception levels in which a packet error rate is substantially 0%, the range corresponding to the transmission rate of the first radio wave; and when it is determined to switch from the one antenna to the another antenna, controlling switching of the antennas so as to receive via the another antenna a second radio wave of a packet different from a packet of the first radio wave.

According to still another aspect of the present invention, there is provided a computer readable medium storing a program for controlling a process of receiving radio waves via first and second antennas and for causing a computer to perform the process. The program includes obtaining a reception level of a first radio wave received via one antenna of the first and second antennas, and a transmission rate representing a transmission speed of the first radio wave, the transmission rate being included in the first radio wave and being set by a transmitting apparatus transmitting the first radio wave; determining whether to switch from the one antenna to another antenna based on the reception level of the first radio wave and a range of reception levels in which a packet error rate is substantially 0%, the range corresponding to the transmission rate of the first radio wave; and when it is determined to switch from the one antenna to the another antenna, controlling switching of the antennas so as to receive via the another antenna a second radio wave of a packet different from a packet of the first radio wave.

According to the present invention, in receiving a radio wave via one of two antennas, the antennas can be controlled easily. In particular, according to the present invention, in receiving a radio wave via one of two antennas, the antennas can be controlled optimally. It is also possible to reduce cost.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a diagram of assistance in explaining a wireless LAN device controlling conventional diversity antennas;

FIG. 2 is a diagram showing an example of the general configuration of a communication system to which the present invention is applied;

FIG. 3 is a block diagram showing an example of the configuration of the base station in FIG. 2;

FIG. 4 is a block diagram showing an example of the configuration of the display apparatus in FIG. 2;

FIG. 8 is a diagram showing an example of the frame structure defined in IEEE802.11a;

FIG. 14 is a diagram of assistance in explaining ranges of packet errors;

FIG. 15 is a diagram of assistance in explaining ranges of packet errors; and

DETAILED DESCRIPTION

Figure 5:
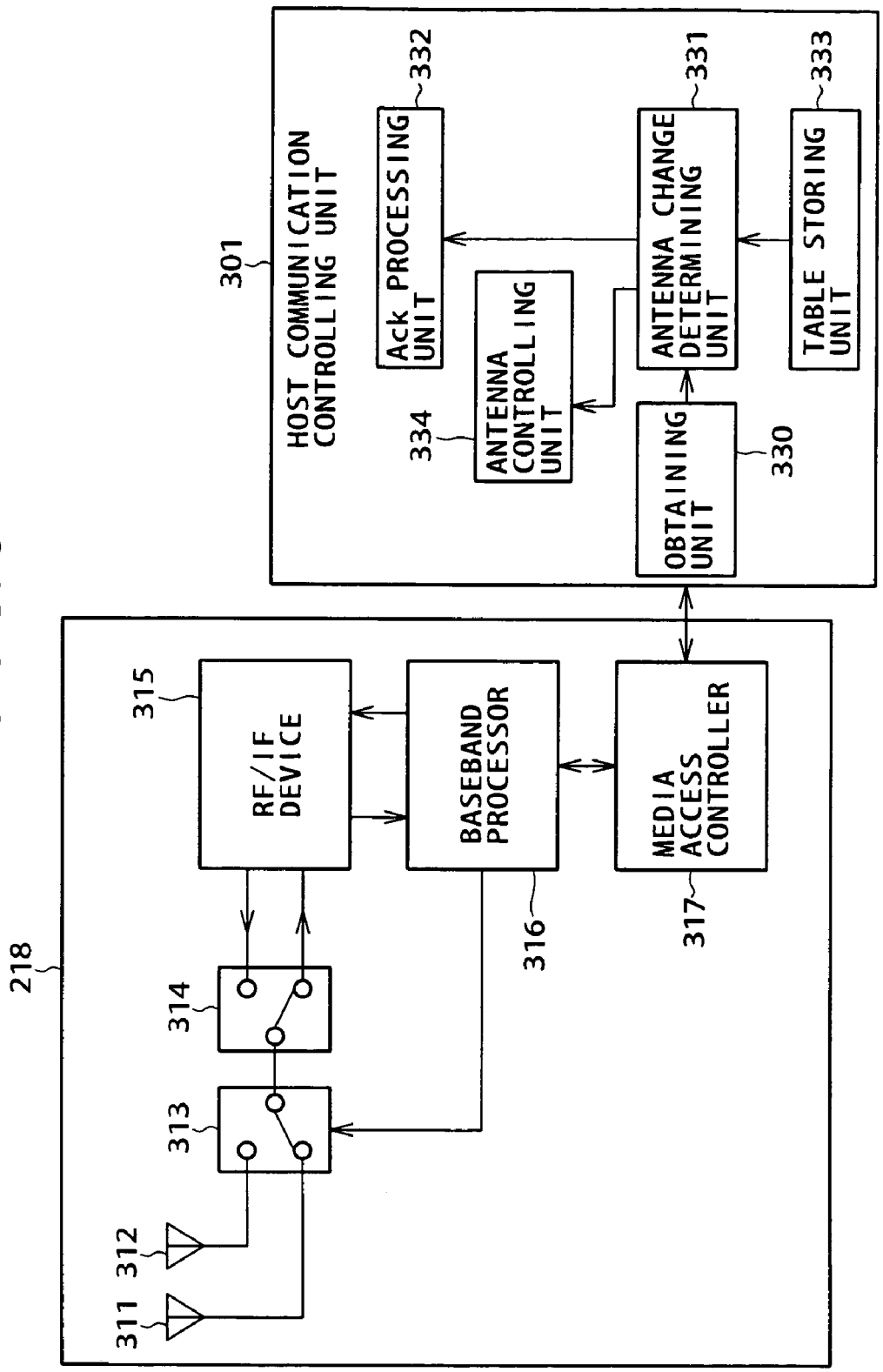
FIG. 5 is a block diagram showing an example of a radio communication unit and a host communication controlling unit of the display apparatus.

Preferred embodiments of the present invention will hereinafter be described. The correspondence between inventions described in the present specification and embodiments of the inventions are illustrated as follows. This description is to confirm that the embodiments supporting the inventions described in the present specification are described in the present specification. Therefore, even when there is an embodiment described in the embodiments of the inventions but not described here as corresponding to an invention, it does not signify that the embodiment does not correspond to the invention. Conversely, even when an embodiment is described here as corresponding to an invention, it does not signify that the embodiment does not correspond to inventions other than that invention.

Further, this description does not represent all of the inventions described in the present specification. In other words, this description does not negate the presence of inventions described in the present specification but not claimed in the present application, that is, the presence of inventions for divisional applications or to appear or be added by amendments in the future.

A receiving apparatus according to the invention (for example, the host communication controlling unit 301 in FIG. 5) includes an obtaining unit (for example, the obtaining unit 330 in FIG. 5 that performs the process of step S101 in FIG. 12) operable to obtain a reception level (for example, a received signal level) of a first radio wave received via one antenna of a first antenna (for example, antenna 311 in FIG. 5) and a second antenna (for example, antenna 312 in FIG. 5), and a transmission rate representing a transmission speed of the first radio wave, the transmission rate being included in the first radio wave and being set by a transmitting apparatus (for example, the base station 121 in FIG. 2) transmitting the first radio wave; a storing unit (for example, the table storing unit 333 in FIG. 5) operable to store, for each of a plurality of transmission rates, a range of reception levels in which a packet error rate is substantially 0% (for example, table 380 in FIG. 6); a determining unit (for example, the antenna switching unit 331 in FIG. 5 that performs the process of step S103 in FIG. 12) operable to determine whether to switch from the one antenna to another antenna based on the reception level of the first radio wave and a first range of reception levels stored in the storing unit which correspond to the transmission rate of the first radio wave; and a controlling unit (for example, the antenna controlling unit 334 in FIG. 5 that performs the process of step S107 in FIG. 12) operable to control switching of the antennas when the determining unit determines to switch from the one antenna to the another antenna so as to receive via the another antenna a second radio wave of a packet different from a packet of the first radio wave.

Figure 12:
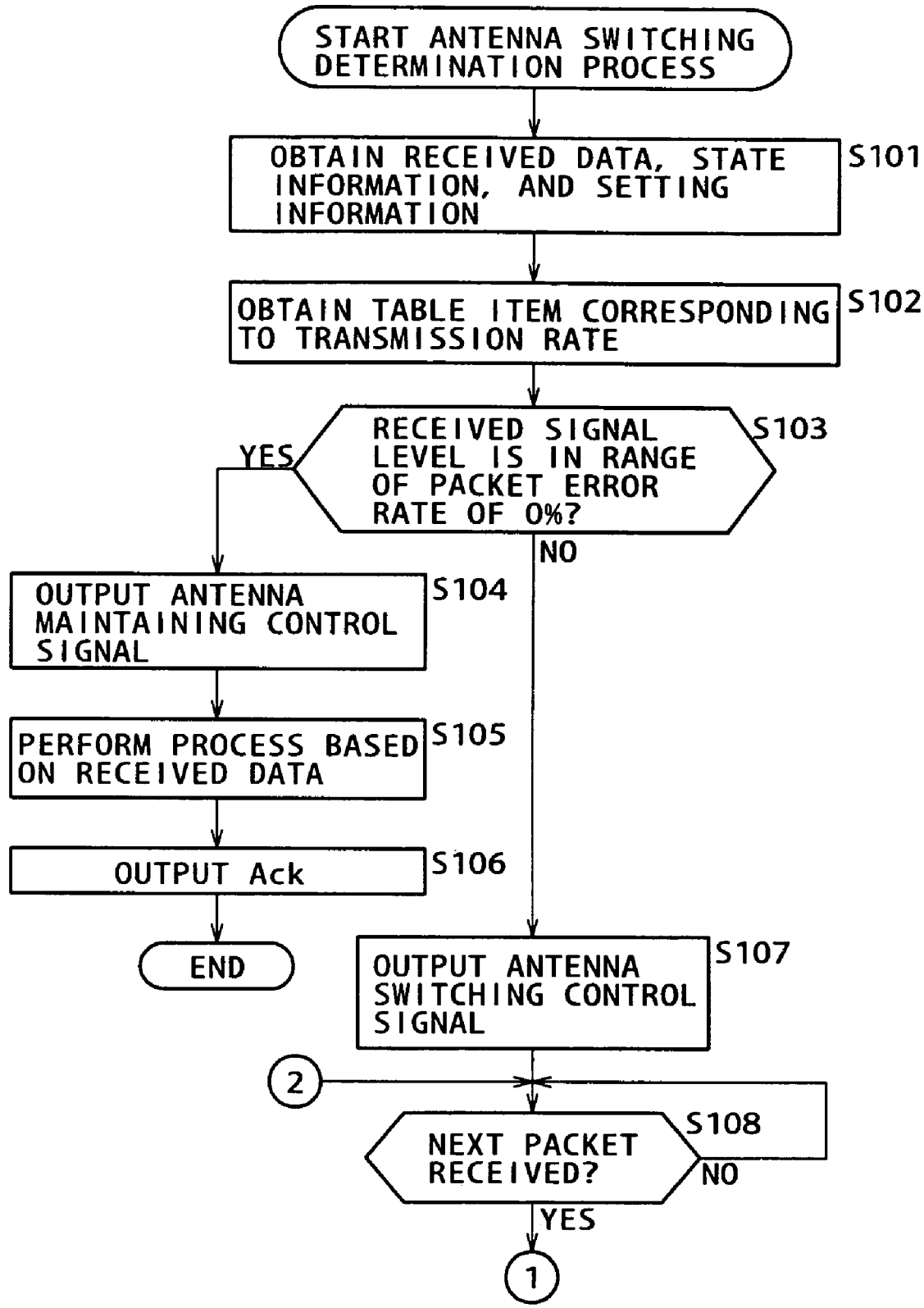
FIG. 12 is a flowchart of assistance in explaining an antenna switching determination process of the host communication controlling unit.

The determining unit in the receiving apparatus determines that switching to the another antenna is not to be performed when the reception level of the first radio wave is within the first range of reception levels (for example, when the result of the determination in step S103 in FIG. 12 is YES), and determines that switching to the another antenna is to be performed when the reception level of the first radio wave is not within the first range of reception levels (for example, when the result of the determination in step S103 in FIG. 12 is NO).

Figure 13:
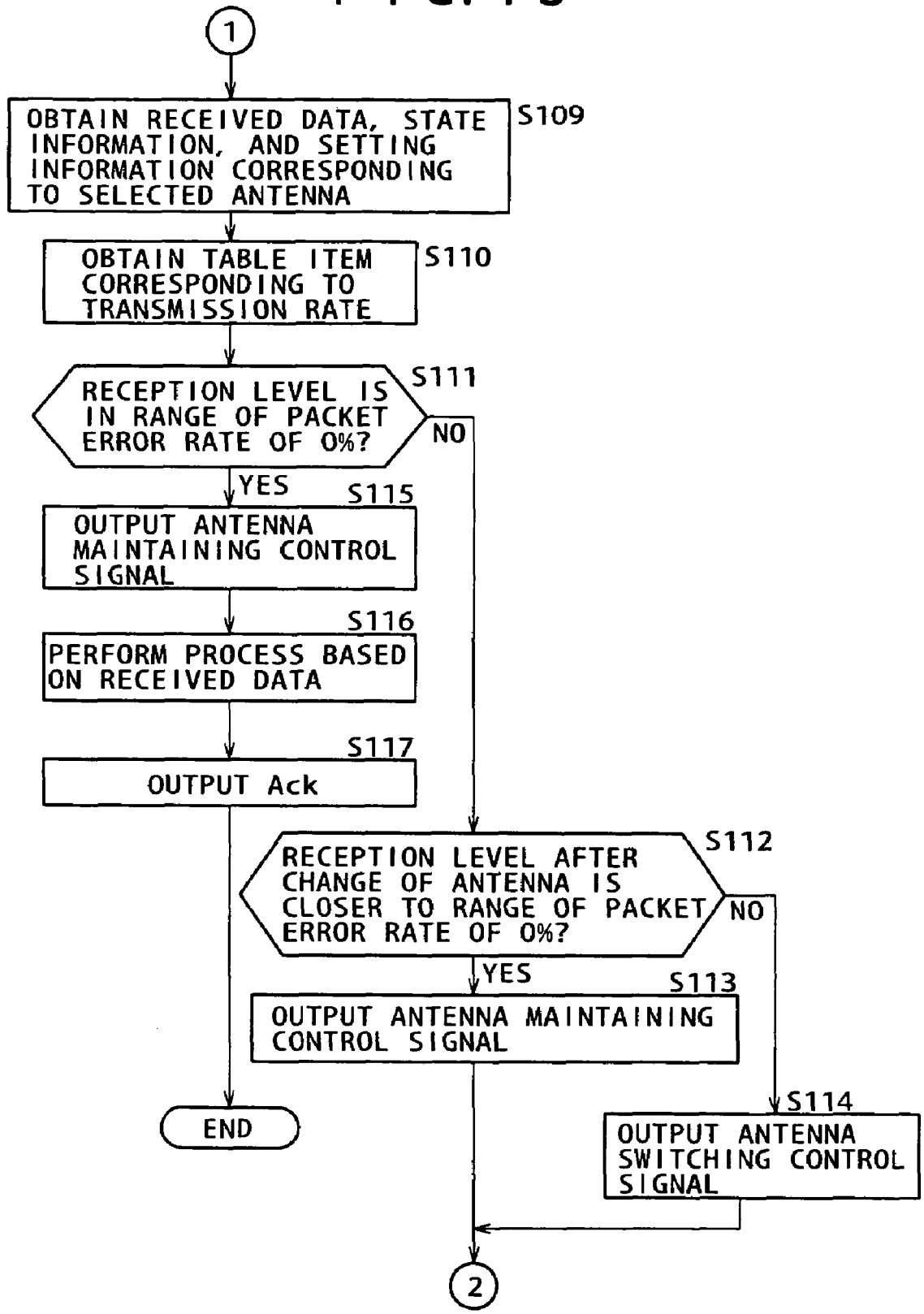
FIG. 13 is a flowchart of assistance in explaining the antenna switching determination process of the host communication controlling unit.

When the determining unit in the receiving apparatus determines that switching to the another antenna is to be performed (for example, when the result of the determination in step S103 in FIG. 12 is NO), the obtaining unit obtains a reception level of the second radio wave received via the another antenna, and a transmission rate representing a transmission speed of the second radio wave, the transmission rate being included in the second radio wave and being set by the transmitting apparatus transmitting the second radio wave (for example, step S109 in FIG. 13); and when the reception level of the second radio wave is not within a second range of reception levels stored in the storing unit which correspond to the transmission rate of the second radio wave (for example, when the result of the determination in step S111 in FIG. 13 is NO), and when the reception level of the first radio wave is closer to the first range of reception levels than the reception level of the second radio wave is to the second range of reception levels (for example, when the result of the determination in step S112 in FIG. 13 is NO), the determining unit determines that switching to the one antenna is to be performed, and when the reception level of the first radio wave is not closer to the first range of reception levels than the reception level of the second radio wave is to the second range of reception levels (for example, when the result of the determination in step S112 in FIG. 13 is YES), the determining unit determines that switching to the one antenna is not to be performed.

The receiving apparatus further includes a requesting unit (for example, the Ack processing unit 332 in FIG. 5 that performs the process of step S106 in FIG. 12 or step S117) operable to request the transmitting apparatus to lower a transmission rate representing a transmission speed of the second radio wave when the determining unit determines that switching from the one antenna to the another antenna is to be performed.

A receiving method according to the invention includes obtaining (for example, step S101 in FIG. 12) a reception level (for example, a received signal level) of a first radio wave received via one antenna of a first antenna (for example, the antenna 311 in FIG. 5) and a second antenna (for example, the antenna 312 in FIG. 5), and a transmission rate representing a transmission speed of the first radio wave, the transmission rate being included in the first radio wave and being set by a transmitting apparatus (for example, the base station 121 in FIG. 2) transmitting the first radio wave; determining (for example, step S103 in FIG. 12) whether to switch from the one antenna to another antenna based on the reception level of the first radio wave and a range of reception levels (for example, the table 380 in FIG. 6) in which a packet error rate is substantially 0%, the range corresponding to the transmission rate of the first radio wave; and controlling (for example, step S107 in FIG. 12) the switching of the antennas when it is determined to switch from the one antenna to the another antenna (for example, when the result of the determination in step S103 in FIG. 12 is NO), so as to receive via the another antenna a second radio wave of a packet different from a packet of the first radio wave.

A computer readable medium storing a program according to the invention causes a computer to perform a process including obtaining (for example, step S101 in FIG. 12) a reception level (for example, a received signal level) of a first radio wave received via one antenna of a first antenna (for example, the antenna 311 in FIG. 5) and a second antenna (for example, the antenna 312 in FIG. 5), and a transmission rate representing a transmission speed of the first radio wave, the transmission rate being included in the first radio wave and being set by a transmitting apparatus (for example, the base station 121 in FIG. 2) transmitting the first radio wave; determining (for example, step S103 in FIG. 12) whether to switch from the one antenna to another antenna based on the reception level of the first radio wave and a range of reception levels (for example, the table 380 in FIG. 6) in which a packet error rate is substantially 0%, the range corresponding to the transmission rate of the first radio wave; and controlling (for example, step S107 in FIG. 12) the switching of the antennas when it is determined to switch from the one antenna to the another antenna (for example, when the result of the determination in step S103 in FIG. 12 is NO), so as to receive via the another antenna a second radio wave of a packet different from a packet of the first radio wave.

A preferred embodiment of the present invention will hereinafter be described with reference to the drawings.

FIG. 2 is a diagram showing an example of the general configuration of a communication system to which the present invention is applied.

The communication system 100 includes a base station 121 and a display apparatus 131.

The base station 121 has a radio communication unit 193 to be described later with reference to FIG. 3 to communicate with the display apparatus 131 by radio waves. Further, the base station 121 is connected with a television broadcast receiving antenna 122. Therefore, the base station 121 can extract a program signal in response to information for specifying a channel to be selected, which information is transmitted from the display apparatus 131. The base station 121 converts the extracted program signal into digital program data, compresses the digital program data by an MPEG (Moving Picture Experts Group) 2 format, for example, and then transmits the program data to the display apparatus 131 via radio waves.

The transmitted program data is subjected to decompression processing and reproduction processing in the display apparatus 131. Video of the program is displayed on an LCD (Liquid Crystal Display) 134, and audio of the program is output to speakers 135-1 and 135-2. Thereby a user can specify a channel or the like using various operating buttons of an operating unit 132 or a touch pen 133 while holding the display apparatus 131, and view a television program while moving freely.

Using the display apparatus 131, the user can send and receive electronic mail, or load a memory card 137 as a storing medium into a memory card slot 136 and display a still picture stored in the memory card 137 on the LCD 134.

Further, by operating an index display button provided in the operating unit 132, the user can, for example, change a television program being displayed, or display an index panel for changing various functions (a television program viewing function, a Web (World Wide Web) page viewing function, an electronic mail function and the like) on the LCD 134.

FIG. 3 is a block diagram showing an example of the configuration of the base station 121 in FIG. 2.

A CPU (Central Processing Unit) 181 expands a control program stored in a ROM (Read Only Memory) 183 into a RAM (Random Access Memory) 184 to control operation of each part connected to the CPU 181 via a bus 182 in response to an instruction input from an input unit 186 and an instruction transmitted from the display apparatus 131 via the radio communication unit 193.

A flash memory 185 is a non-volatile memory. The flash memory 185 stores various data. The input unit 186 includes a mouse and a keyboard. The input unit 186 outputs a signal to the CPU 181 corresponding to an input from the user.

A network interface 187 includes an ADSL (Asymmetric Digital Subscriber Line) modem or a LAN (Local Area Network) card, for example. The network interface 187 functions as an interface for communication with various networks such as the Internet and the like.

The CPU 181 supplies an HTML file obtained via the network interface 187, information downloaded via the Internet, and the like to a selector switch 190.

A channel selecting unit 188 extracts a specified program signal from a television broadcast wave received by the television broadcast receiving antenna 122 on the basis of an instruction from the CPU 181. The extracted program signal is supplied to a signal processing unit 189 to be subjected to demodulation processing, amplification processing, analog-to-digital conversion processing and the like, and thereafter supplied to the selector switch 190.

The selector switch 190 selects either a terminal 190-1 or a terminal 190-2 to select data to be supplied to a compression processing unit 191. When the reproduction of a television program is requested by the display apparatus 131 (user), for example, the selector switch 190 supplies television program data supplied from the signal processing unit 189 to the compression processing unit 191 on the basis of an instruction from the CPU 181. On the other hand, when the display of a Web page is requested, for example, the selector switch 190 supplies an HTML file supplied via the bus 182 to the compression processing unit 191.

The compression processing unit 191 compresses the television program data, the HTML file and the like supplied from the selector switch 190 by a predetermined system, and then supplies the resulting data to a transmission buffer 192. The transmission buffer 192 supplies the data supplied from the compression processing unit 191 to the radio communication unit 193 according to timing of an instruction from the CPU 181.

The radio communication unit 193 transmits a signal obtained by subjecting the data supplied from the transmission buffer 192 to modulation processing, digital-to-analog conversion processing and the like to the display apparatus 131 by a radio system complying with IEEE (Institute of Electrical and Electronics Engineers) 802.11a, for example.

Further, the radio communication unit 193 notifies the CPU 181 via the bus 182 of data obtained by subjecting a signal of a URL (Uniform Resource Locator) of a Web server to be accessed, for example, which signal is obtained from the display apparatus 131 via radio waves, to demodulation processing, analog-to-digital conversion processing and the like.

FIG. 4 is a block diagram showing an example of the configuration of the display apparatus 131 in FIG. 2.

A CPU 211 expands a control program stored in a ROM 213 into a RAM 214 to control operation of the whole of the display apparatus 131 on the basis of a signal input from the operating unit 132 or a signal supplied from a touch panel 216 via a bus 212.

A flash memory 215 stores various information such as, for example, address information of a Web site bookmarked by the user and address information of a Web site that is accessed when a site button as described above is operated.

The touch panel 216 is laminated on the LCD 134. When the user provides an input by the touch pen 133, the touch panel 216 detects a position of the input, and notifies information on the detected position to the CPU 211.

A memory card drive 217 reads and writes various data on the memory card 137 inserted in the memory card slot 136 on the basis of an instruction from the CPU 211. For example, the memory card drive 217 reads site button information stored in the memory card 137, and supplies the site button information to the flash memory 215 or the like.

The operating unit 132 includes various buttons. The operating unit 132 notifies various input information input from the user to the CPU 211.

A radio communication unit 218 transmits a signal supplied from the CPU 211 to the base station 121 via radio waves. Further, the radio communication unit 218 receives a signal transmitted from the base station 121, subjects the analog signal to amplification, demodulation, and analog-to-digital conversion processing and the like, and then supplies resulting digital data to a receiving buffer 221.

The receiving buffer 221 outputs the data supplied from the radio communication unit 218 to a decompression processing unit 222 in predetermined timing.

Then, when the data supplied from the receiving buffer 221 is compressed, the decompression processing unit 222 decompresses the data. The decompression processing unit 222 outputs an image signal obtained by subjecting the data to digital-to-analog conversion to an image signal processing unit 223, and outputs an audio signal to an audio signal processing unit 224.

The image signal processing unit 223, for example, displays the image signal supplied from the decompression processing unit 222 on the LCD 134. On the other hand, the audio signal processing unit 224 outputs the audio signal supplied from the decompression processing unit 222 to the speakers 135-1 and 135-2. By the above-described configuration, a television program signal transmitted from the base station 121 via radio waves in a state of being compressed on the basis of MPEG2, for example, is reproduced and presented to the user.

The bus 212 is also connected with a drive 219 as required. A removable medium 220 including a magnetic disk, an optical disk, a magneto-optical disk, a semiconductor memory or the like is loaded into the drive 219 as required. A computer program read from the removable medium 220 is installed into the flash memory 215 as required.

FIG. 5 is a block diagram showing an example of the radio communication unit 218 in FIG. 4 and a host communication controlling unit 301 for controlling the radio communication unit 218.

The radio communication unit 218 is controlled by the host communication controlling unit 301 representing functions of the CPU 211 of the display apparatus 131.

The radio communication unit 218 has an antenna 311, an antenna 312, a diversity antenna changing switch 313, a transmission/reception changing switch 314, an RF (Radio Frequency)/IF (Intermediate Frequency) device 315, a baseband processor 316, and a media access controller 317.

The antenna 311 and the antenna 312 receive and transmit radio waves under control of the RF/IF device 315. The diversity antenna changing switch 313 selects one of the antenna 311 and the antenna 312 under control of the baseband processor 316. The transmission/reception changing switch 314 selects either signal reception or signal transmission under control of the baseband processor 316.

When a packet signal is received, one of the antenna 311 and the antenna 312 is selected by the diversity antenna changing switch 313 (the antenna 311 in the example of FIG. 5). The signal based on the radio wave received by the selected antenna is supplied to the RF/IF device 315 via the transmission/reception changing switch 314.

The RF/IF device 315 passes only a component in a predetermined frequency band of the signal in a high frequency band. Thereby, the RF/IF device 315 obtains an RF signal including the component in the predetermined frequency band. The RF/IF device 315 amplifies the RF signal with a predetermined gain using a built-in LNA, and then down-converts the amplified signal into an IF signal by a built-in mixer. The RF/IF device 315 further subjects the IF signal to baseband demodulation, and supplies the result as a received IQ signal to the baseband processor 316. The RF/IF device 315 also includes a built-in IF level detection circuit. The RF/IF device 315 detects an IF level detection signal using the IF level detection circuit, and then supplies the IF level detection signal to the baseband processor 316.

The baseband processor 316 executes a control program, processes the signal supplied from the RF/IF device 315, and controls the whole of the radio communication unit 218. The baseband processor 316 supplies the received IQ signal as received data to the media access controller 317. Further, the baseband processor 316 obtains a transmission rate representing a transmission speed of the radio wave, which rate is set by the base station 121 on the sender side, from the received IQ signal, and obtains a received signal level (reception level) of the received radio wave on the basis of the IF level detection signal. The baseband processor 316 supplies the transmission rate and the received signal level as state information (state signal) to the media access controller 317. Since the base station 121 on the sender side stores the transmission rate representing the transmission speed of a packet to be transmitted in the packet, the baseband processor 316 obtains the transmission rate. The received signal level is proportional to the amplitude of the received radio wave. Specifically, the received signal level is high when the amplitude is high, that is, when the sender side and the receiver side are close to each other, and the received signal level is low when the amplitude is low, that is, when the sender side and the receiver side are distant from each other.

The baseband processor 316 further sets information indicating the currently selected antenna (the antenna 311 in the example of FIG. 5) as setting information on the basis of a control signal for the diversity antenna changing switch 313. The baseband processor 316 supplies the setting information to the media access controller 317. Thus, the received data, the state information, and the setting information are supplied from the baseband processor 316 to the media access controller 317.

The media access controller 317 supplies the information supplied from the baseband processor 316 (the received data, the state information, and the setting information) to the host communication controlling unit 301.

The host communication controlling unit 301 has an obtaining unit 330, an antenna change determining unit 331, an Ack (ACKnowledgement) processing unit 332, a table storing unit 333, and an antenna controlling unit 334. The obtaining unit 330 obtains the information supplied to the host communication controlling unit 301, and then supplies the information to the antenna change determining unit 331. The antenna change determining unit 331 determines whether to change the antenna on the basis of the information supplied from the obtaining unit 330. The antenna controlling unit 334 controls the changing of the antenna. For example, the antenna controlling unit 334 outputs a control signal to change the antenna or outputs a control signal to maintain the antenna in the selected state on the basis of the setting information indicating the currently selected antenna and a result of the determination of the antenna change determining unit 331. The Ack processing unit 332 performs processing to transmit an Ack to the apparatus on the sender side (the base station 121 in the present embodiment) when the reception of received data (one packet) is completed correctly (without an error). The table storing unit 333 stores a table 380 as shown in FIG. 6.

Figures 6, 7:
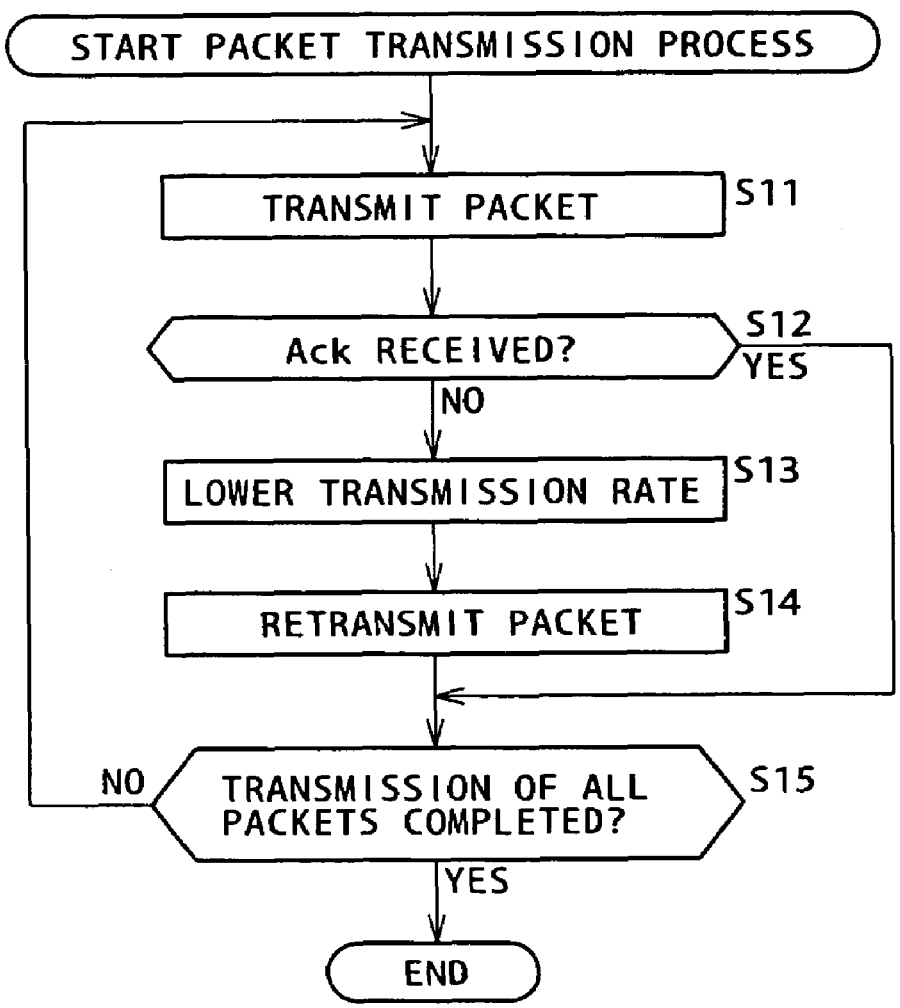
FIG. 6 is a diagram of assistance in explaining a table stored in the table storing unit in FIG. 5.
FIG. 7 is a flowchart of assistance in explaining a packet transmission process of the base station.

In FIG. 6, maximum values and minimum values for a plurality of predetermined transmission rates are entered. The maximum values and the minimum values indicate signal level ranges in which a packet error rate is 0%. Specifically, the maximum values and the minimum values indicate that when the transmission rate of a received packet is 54 Mbps, a signal level in a range of −80 dBm to −30 dBm (−80 dBm or higher and −30 dBm or lower) gives a packet error rate of 0% and that when the transmission rate is 36 Mbps, a signal level in a range of −90 dBm to −20 dBm (−90 dBm or higher and −20 dBm or lower) gives a packet error rate of 0%. That is, the table storing unit 333 stores a range of signal levels in which the packet error rate is 0% for each of the transmission rates as a table item. Incidentally, while the table storing unit 333 stores only two table items for 54 Mbps and 36 Mbps in the example of FIG. 6, the table storing unit 333 in practice stores table items for all transmission rates (for example, 48, 24, 18, 12, 9, and 6 Mbps) at which transmission by the base station 121 on the sender side is possible. The signal level ranges in which the packet error rate is 0% are determined on an experimental or empirical basis, and are set appropriately by a manufacturer at the time of shipment. Incidentally, while in the present embodiment, the packet error rate in the above-described ranges is 0%, the packet error rate in the ranges may be substantially 0%.

The antenna change determining unit 331 determines whether the antenna needs to be changed on the basis of the setting information supplied to the host communication controlling unit 301 and the signal level range in which the packet error rate is 0%, which range is stored in the table storing unit 333. Specifically, the antenna change determining unit 331 determines whether the antenna needs to be changed by comparing a table item of the transmission rate (the transmission rate included in the state information) (in the case of a transmission rate of 54 Mbps, the range in which the packet error rate at 54 Mbps is 0%) with the received signal level of the radio wave received via the selected antenna (the received signal level included in the state information). That is, when the received signal level of the radio wave received via the antenna falls within the range in which the packet error rate is 0%, the antenna change determining unit 331 determines that the antenna does not need to be changed. When the received signal level does not fall within the range in which the packet error rate is 0%, the antenna change determining unit 331 determines that the antenna needs to be changed. The antenna controlling unit 334 supplies the media access controller 317 with an antenna switching control signal based on a result of the determination of the antenna change determining unit 331 and the setting information as information on the currently selected antenna.

The media access controller 317 supplies the antenna switching control signal to the baseband processor 316. The baseband processor 316 controls the diversity antenna changing switch 313 to switch the antenna to the other antenna (the antenna 312 in the example of FIG. 5) on the basis of the antenna switching control signal. Thereby, a next packet (a radio wave corresponding to a packet signal) is received via the antenna 312, and information is supplied to the host communication controlling unit 301 through the same path as described above.

Incidentally, the configuration of the radio communication unit 193 and a processing unit for controlling the radio communication unit 193 in the base station 121 is the same as that of the radio communication unit 218 in the display apparatus 131 in FIG. 5, and therefore a description of the configuration of the radio communication unit 193 and the processing unit for controlling the radio communication unit 193 in the base station 121 will be omitted. The configuration of the radio communication unit 218 will hereinafter be cited also as the configuration of the radio communication unit 193.

A packet transmission process of the base station 121 will next be described with reference to the flowchart of FIG. 7. The description in the present embodiment will be made supposing that the base station 121 is the data sender side and that the display apparatus 131 is the data receiver side. Incidentally, this process is started when a command to transmit specified data is input to the base station 121 from the user (via the display apparatus 131, for example,).

In step S11, the radio communication unit 193 of the base station 121 generates and transmits a packet including the specified data under control of the CPU 181. Specifically, the radio communication unit 193 transmits a signal, obtained by subjecting the packet (data) to be transmitted to modulation processing, digital-to-analog conversion processing and the like, to the display apparatus 131 by a radio system compliant with IEEE802.11a, for example. Though the structure of this packet will be described later with reference to FIG. 8, the packet includes data indicating the transmission rate of the transmitting radio wave, which rate is set by the radio communication unit 193.

On completing the reception of the packet, the display apparatus 131 transmits an Ack to the base station 121 indicating that the reception of the packet has been completed. When a packet error occurs or when a packet loss occurs (when the packet cannot be received correctly), the display apparatus 131 does not transmit an Ack. Incidentally, details of this process will be described later with reference to FIGS. 10 to 13.

Accordingly, in step S12, the Ack processing unit 332 in the radio communication unit 193 of the base station 121 determines whether or not an Ack has been received. When the Ack processing unit 332 determines that an Ack has not been received, the radio communication unit 193 of the base station 121 makes a setting so as to lower the transmission rate in step S13. Specifically, when no Ack is received, it indicates that the apparatus on the receiver side (the display apparatus 131 in the present embodiment) cannot deal with the present transmission rate. Therefore, the radio communication unit 193 of the base station 121 makes a setting so that the next packet will be transmitted at a lower transmission rate.

In step S14, the radio communication unit 193 retransmits the packet transmitted in the process of step S11 under control of the CPU 181. When an Ack is not received by the radio communication unit 193 on the sender side, it indicates that the packet transmitted in the process of step S11 by the radio communication unit 193 on the sender side has not been received by the display apparatus 131 on the receiver side. Thus, in step S14, a packet that is the same as the packet transmitted in step S11 and in which only data indicating the transmission rate is different from that of the packet transmitted in step S11 (that is, a packet having the same data part) is retransmitted at a lower transmission rate. The packet is transmitted to the display apparatus 131.

When the Ack processing unit 332 determines in step S12 that an Ack has been received, or after the process of step S14, a determination is made in step S15 as to whether transmission of all packets has been completed. When it is determined that there is a packet yet to be transmitted (transmission of all packets has not been completed), the process returns to step S11 to repeat the process from step S11 on down. That is, the next packet is transmitted. When it is determined in step S15 that transmission of all packets has been completed, the process is ended.

With the process of FIG. 7, the base station 121 on the sender side lowers the transmission rate when an Ack is not transmitted (returned) from the display apparatus 131 on the receiver side after transmission of a packet. It is therefore possible to transmit a packet at a transmission rate corresponding to the receiving capability of the display apparatus 131 on the receiver side. That is, the display apparatus 131 on the receiver side can request the base station 121 on the sender side to lower the transmission rate by not returning an Ack.

Incidentally, in practice, a second packet is transmitted before an Ack corresponding to the first packet is returned after transmission of the first packet. When an Ack corresponding to the first packet is not returned after transmission of the first packet and the second packet, for example, the first packet is retransmitted.

While in the example of FIG. 7, the transmission rate is lowered on condition that an Ack is not returned once, the transmission rate may be lowered when an Ack is not returned a predetermined number of times or when an Ack is not returned a predetermined number of consecutive times, for example.

Figure 8:
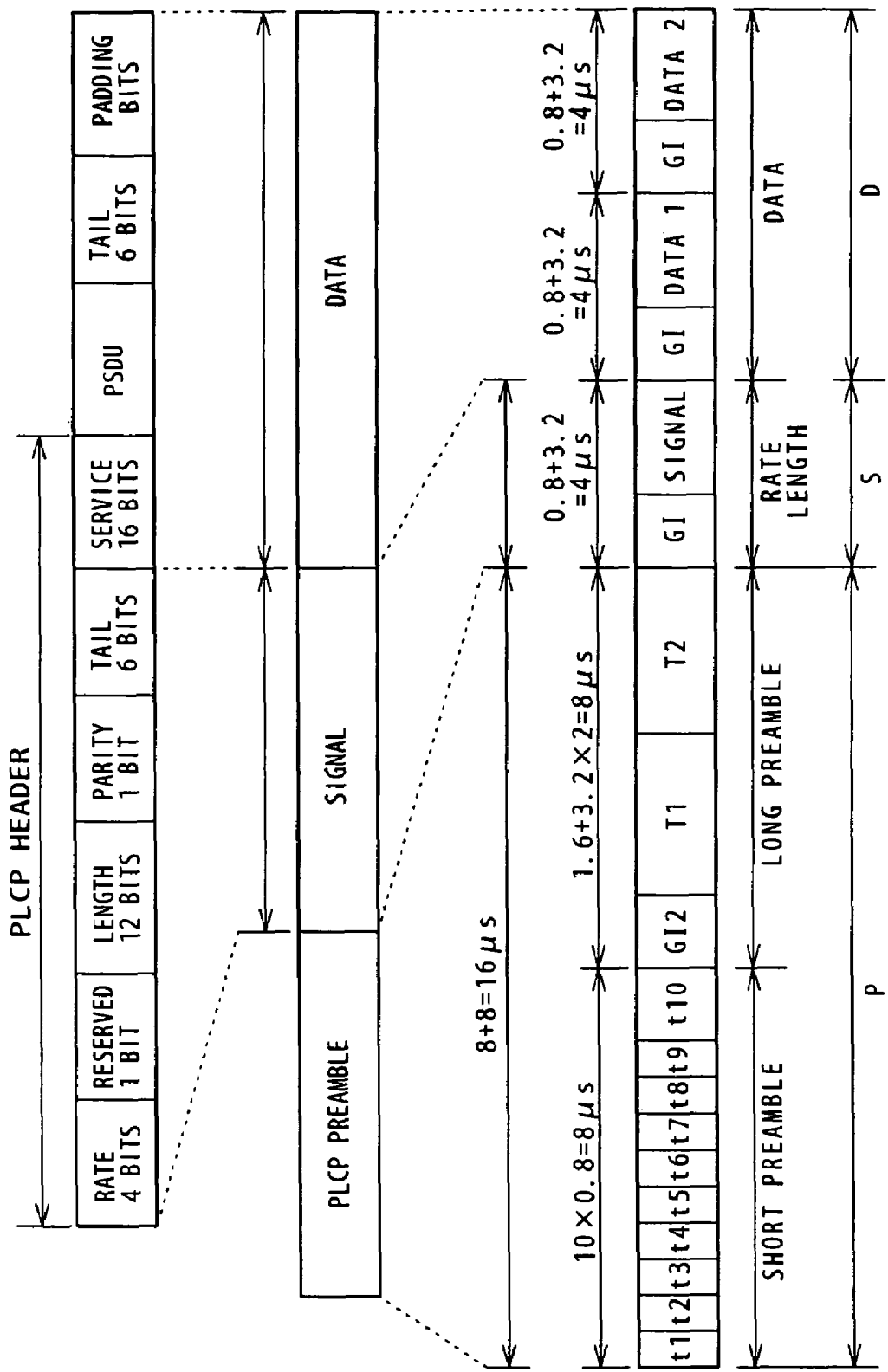

An example of the frame structure of the packet transmitted in step S11 in FIG. 7 is shown in FIG. 8. FIG. 8 is a diagram showing an example of the frame structure defined in IEEE802.11a.

As shown in FIG. 8, a frame includes a "PLCP preamble" field, a "SIGNAL" field, and a "data" field. The "PLCP preamble" field is a known fixed pattern signal, that is, a 16-µs fixed waveform signal necessary for synchronization of reception of a radio packet signal. The "SIGNAL" field is one OFDM symbol used for storing information of the transmission speed (RATE) and data length (LENGTH). The "data" field is used to store effective data.

The "PLCP preamble" includes a "short preamble" and a "long preamble." The "short preamble" is used mainly for AFC (Automatic Frequency Control) for timing detection. The "long preamble" is used mainly for channel estimation for AFC fine adjustment. The short preamble includes 10 symbols. The length of the short preamble is 10 (t1 to t10)× 0.8=8 µs. The long preamble includes a GI (Guard Interval) and two symbols. The length of the long preamble is 1.6 (GI)+3.2×2 (T1 and T2)=8 µs. That is, the length of the PLCP preamble (hereinafter referred to as a preamble) is 16 µs.

The "SIGNAL" field includes a 4-bit "RATE" field indicating the transmission speed, a 1-bit "Reserved" field, a 12-bit "LENGTH" field for storing octet length of a data part, a 1-bit "Parity" field, and a 6-bit "Tail" field for storing code bits for terminating convolutional coding. Incidentally, the "LENGTH" field requires 6 bits when the constraint length is 7. This "SIGNAL" field is encoded by an OFDM system and BPSK with r=½. The length of the "SIGNAL" field is 0.8 (GI)+3.2 (SIGNAL)=4 µs.

The "data" field includes a 16-bit "SERVICE" field, a "PSDU (PLCP Service Data Unit)" field storing data proper transmitted by a physical layer, a 6-bit "Tail" field, and a "padding bit" field. The data is divided into units of 0.8 (GI)+3.2 (data 1)=4 µs.

A PLCP header is stored in the "SIGNAL" field and the "SERVICE" field at a start of the "data" field. Incidentally, a control signal Ack indicating that information is received is stored in the "PSDU" following the "SERVICE" field.

Thus, the packet transmitted in step S11 includes the transmission rate (stored in the "RATE" field). Since the transmission rate is lowered in step S13 before step S14, the packet retransmitted in step S14 has different data only in the "RATE" field than that of the packet transmitted in step S11, but otherwise the packet retransmitted in step S14 is the same as the packet transmitted in step S11.

A packet reception process of the radio communication unit 218 in the display apparatus 131 of FIG. 5, which process corresponds to the packet transmission process of FIG. 7, will next be described with reference to the flowchart of FIG. 9. Incidentally, this process is started when a command to receive predetermined information is given by the user.

In step S51, the RF/IF device 315 receives a signal corresponding to a radio wave received via the currently selected antenna (for example, the antenna 311). For example, the antenna 311 receives a radio wave transmitted from the base station 121, and supplies a signal corresponding to the received radio wave to the diversity antenna changing switch 313. Since the diversity antenna changing switch 313 selects the antenna 311 on the basis of an antenna switching control signal supplied from the baseband processor 316, the signal from the antenna 311 is supplied to the RF/IF device 315 via the transmission/reception changing switch 314. The RF/IF device 315 receives the signal corresponding to the radio wave received via one of the antenna 311 and the antenna 312.

Figure 11:
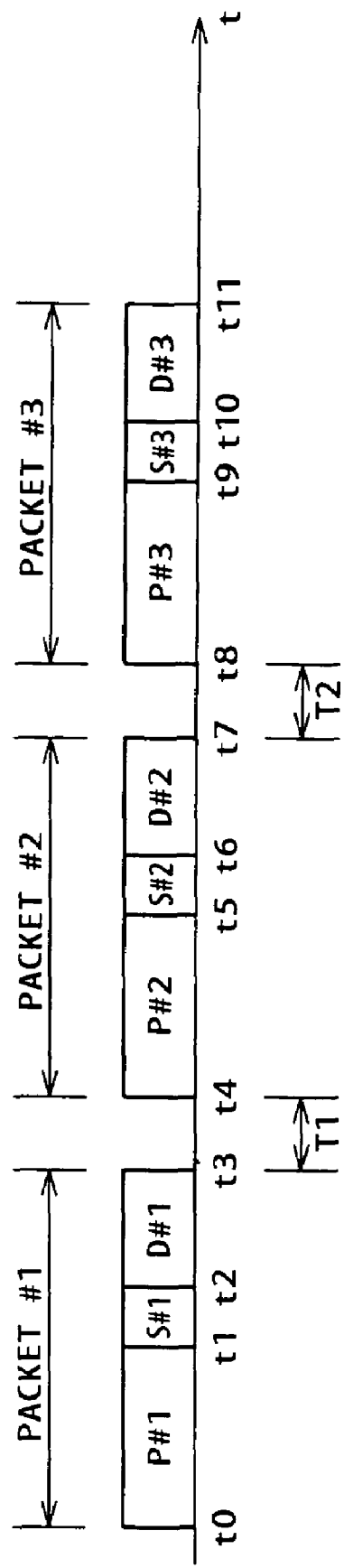
FIG. 11 is a diagram of assistance in explaining the flow of packet reception.

For example, packets transmitted by repeating the process of step S11 in FIG. 7 are received by the display apparatus 131 on the receiver side as shown in FIG. 11.

The horizontal axis in FIG. 11 represents time t. P#n (n=1, 2, 3) corresponds to a "preamble (PLCP preamble)" in FIG. 8; S#n (n=1, 2, 3) corresponds to "SIGNAL"; and D#n corresponds to "data." Numbers added to the rear of # each correspond to the order of the received packets. Specifically, P#1, S#1, and D#1 received in a period from time t0 to time t3 are a packet #1 received first. P#2, S#2, and D#2 received in a period from time t4 to time t7 are a packet #2 received second. P#3, S#3, and D#3 received in a period from time t8 to time t11 are a packet #3 received third. In step S51 for the first time, the packet #1 in FIG. 11 is received.

Returning to FIG. 9, in step S52, the RF/IF device 315 obtains an RF signal from the received signal, and converts the RF signal into an IF signal. Specifically, the RF/IF device 315 passes only a component in a predetermined frequency band of the received signal in a high frequency band, and thereby obtains an RF signal including the component in the predetermined frequency band. The RF/IF device 315 converts the RF signal into an IF signal by amplifying the RF signal with a predetermined gain using a built-in LNA and then down-converting the amplified signal into an IF signal by a built-in mixer.

In step S53, the RF/IF device 315 subjects the IF signal to baseband demodulation, and supplies the result as a received IQ signal to the baseband processor 316.

In step S54, the RF/IF device 315 detects an IF level detection signal using a built-in IF level detection circuit, and then supplies the IF level detection signal to the baseband processor 316. As a result of the processes of step S53 and step S54, the baseband processor 316 is supplied with the received IQ signal and the IF level detection signal.

In step S55, the baseband processor 316 obtains the transmission rate on the basis of the received IQ signal. Specifically, the baseband processor 316 obtains the transmission speed stored in the "RATE" field in FIG. 8 as the transmission rate. The baseband processor 316 obtains a transmission rate of 54 Mbps, for example.

In step S56, the baseband processor 316 obtains a received signal level on the basis of the IF level detection signal.

In step S57, the baseband processor 316 supplies the transmission rate and the received signal level as state information to the media access controller 317. In step S58, the baseband processor 316 supplies the IQ signal as received data to the media access controller 317.

Figure 10:
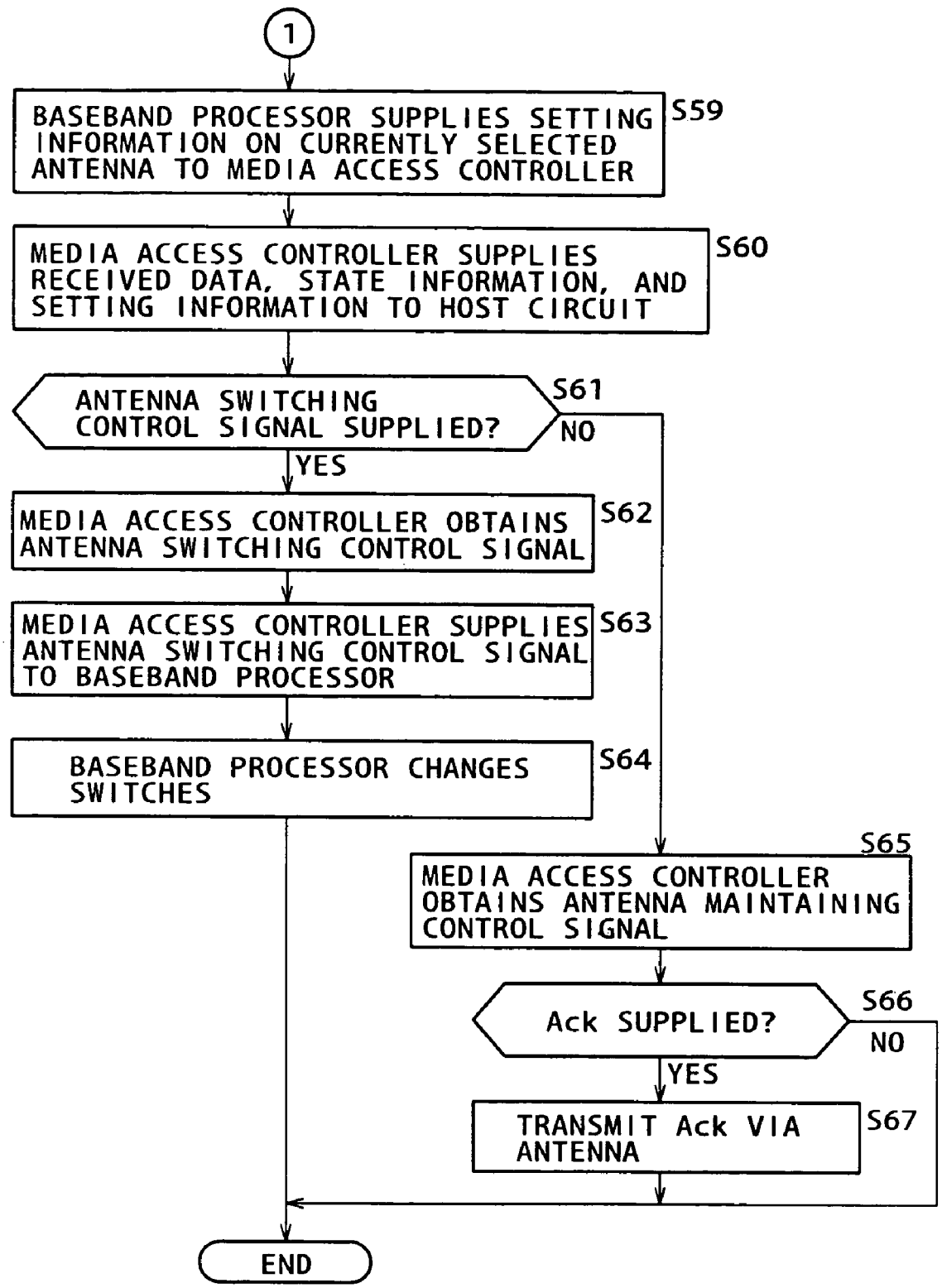
FIG. 10 is a flowchart of assistance in explaining the packet reception process of the radio communication unit.

In step S59 shown in FIG. 10, the baseband processor 316 supplies setting information on the currently selected antenna (the antenna 311 in the example of FIG. 5) to the media access controller 317.

In step S60, the media access controller 317 supplies the received data, the state information, and the setting information to the host communication controlling unit 301.

In response to this, the host communication controlling unit 301 receives the received data, the state information, and the setting information. The host communication controlling unit 301 determines whether or not to change the antenna on the basis of these pieces of information. When the host communication controlling unit 301 determines that the antenna is to be changed, the host communication controlling unit 301 outputs an antenna switching control signal to the media access controller 317. When the host communication controlling unit 301 determines that the antenna is not to be changed, the host communication controlling unit 301 outputs an antenna maintaining control signal to the media access controller 317 (processes in FIG. 12 and FIG. 13 to be described later).

Accordingly, in step S61, the media access controller 317 determines whether an antenna switching control signal has been supplied from the host communication controlling unit 301. When the media access controller 317 determines that an antenna switching control signal has been supplied from the host communication controlling unit 301, the media access controller 317 in step S62 obtains the antenna switching control signal.

In step S63, the media access controller 317 supplies the antenna switching control signal to the baseband processor 316.

In step S64, the baseband processor 316 switches the diversity antenna changing switch 313 on the basis of the antenna switching control signal. Specifically, the baseband processor 316 switches the diversity antenna changing switch 313 from the current antenna 311 to the antenna 312. Thus, a signal based on a radio wave received by the antenna 312 is thereafter supplied to the RF/IF device 315.

When the media access controller 317 determines in step S61 that an antenna switching control signal has not been supplied, that is, an antenna maintaining control signal has been supplied, the media access controller 317 in step S65 obtains the antenna maintaining control signal.

When it is determined that the antenna is not to be changed, and when the packet #1 (data D#1) in FIG. 11 is received correctly (without an error), the host communication controlling unit 301 supplies an Ack to the radio communication unit 218 indicating that the packet has been received.

Accordingly, the media access controller 317 in step S66 determines whether an Ack has been supplied from the host communication controlling unit 301. When the media access controller 317 determines that an Ack has been supplied from the host communication controlling unit 301, the Ack is transmitted via the antenna 311 in step S67. Thereby, the base station 121 on the sender side can confirm that the display apparatus 131 on the receiver side received the packet correctly.

After the process of step S64, after the process of step S67, and when the media access controller 317 determines in step S66 that an Ack has not been supplied, the process is ended.

Figure 9:
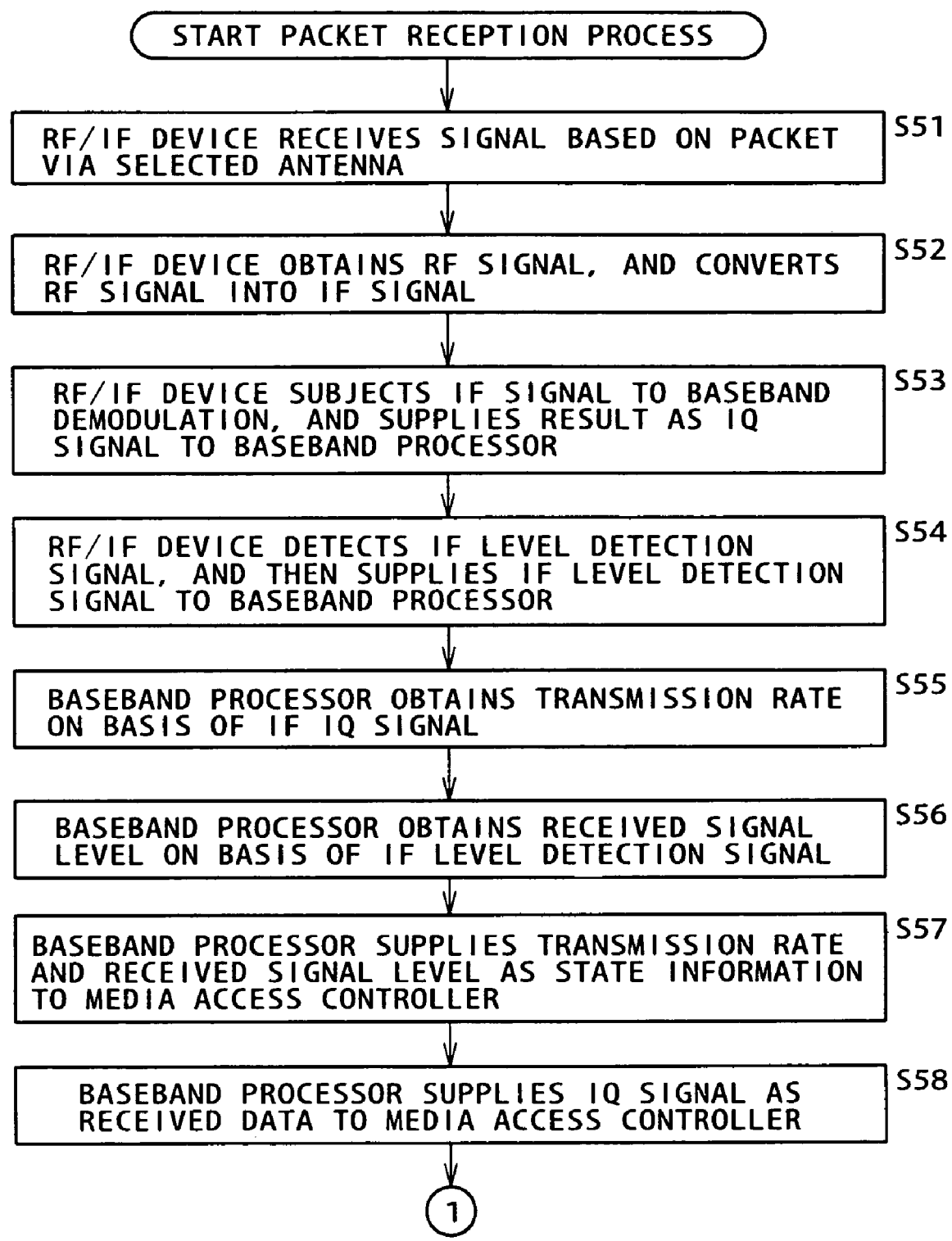
FIG. 9 is a flowchart of assistance in explaining a packet reception process of the radio communication unit.

By the process of FIG. 9 and FIG. 10, one packet is received by one of the two antennas 311 and 312, the received packet is subjected to various processes, and thereafter the diversity antenna changing switch 313 is switched on the basis of a control signal from the host communication controlling unit 301.

An antenna switching determination process of the host communication controlling unit 301 in FIG. 5 will next be described with reference to the flowchart of FIG. 12. This process is started when the media access controller 317 supplies received data, state information, and setting information to the host communication controlling unit 301 by the process of step S60 in FIG. 10.

In step S101, the obtaining unit 330 of the host communication controlling unit 301 obtains the received data, state information, and setting information from the media access controller 317. The obtaining unit 330 supplies the state information, that is, a transmission rate and a reception level, to the antenna change determining unit 331.

In step S102, the antenna change determining unit 331 obtains a table item corresponding to the transmission rate included in the state information from the table storing unit 333. When the transmission rate is 54 Mbps, for example, the antenna change determining unit 331 obtains the information shown in FIG. 6 indicating that a signal level in the range of −80 dBm to −30 dBm (−80 dBm or higher and −30 dBm or lower) gives a packet error rate of 0%.

In step S103, the antenna change determining unit 331 determines whether the received signal level included in the state information is in the range where the packet error rate is 0%, which range is obtained by the process of step S102. When the range where the packet error rate is 0% is shown in FIG. 14, for example, the antenna change determining unit 331 determines whether the received signal level included in the state information is in the range of −80 dBm to −30 dBm. Specifically, when the received signal level is −50 dBm, the antenna change determining unit 331 determines that the received signal level is in the range where the packet error rate is 0%. When the received signal level is −20 dBm, the antenna change determining unit 331 determines that the received signal level is not in the range where the packet error rate is 0%. Thereby, the antenna change determining unit 331 determines whether to change the antenna. Incidentally, in FIG. 14, the abscissa represents the received signal level (dBm), and the ordinate represents the error rate (PER (Packet Error Rate)).

When the antenna change determining unit 331 determines in step S103 that the received signal level is in the range where the packet error rate is 0%, the antenna controlling unit 334 in step S104 outputs an antenna maintaining control signal to the radio communication unit 218 (media access controller 317). Specifically, since the setting information obtained by the process of step S101 includes information indicating the currently selected antenna 311, the antenna controlling unit 334 generates and outputs a control signal to select the antenna 311. The radio communication unit 218 receives this control signal (the process of step S65 in FIG. 10), and maintains the antenna in the selected state. Incidentally, while in the present embodiment, the antenna controlling unit 334 transmits an antenna maintaining control signal when the antenna is to be maintained in the selected state (when the antenna is not to be changed), the antenna may of course be maintained in the selected state by transmitting nothing.

In step S105, the host communication controlling unit 301 performs a process based on the received data. That is, since the received signal level is in the range where the packet error rate is 0%, the host communication controlling unit 301 performs a process based on the received data (the received data obtained by the obtaining unit 330) of the packet. Specifically, various processes are performed in the display apparatus 131, but details thereof will be omitted.

In step S106, the Ack processing unit 332 outputs an Ack to the media access controller 317 indicating that the data has been received. In response to this, each part of the radio communication unit 218 operates to transmit the Ack to the base station 121 on the sender side via the currently selected antenna (for example, the antenna 311) (the process of step S66 and step S67 in FIG. 10). The base station 121 on the sender side receives the Ack, and adjusts the transmission rate as described above (the process of step S12 and step S13 in FIG. 7). Then the process is ended.

When the antenna change determining unit 331 determines in step S103 that the received signal level is not in the range where the packet error rate is 0%, the antenna controlling unit 334 in step S107 outputs a control signal to the radio communication unit 218 (media access controller 317) to change the antenna. Specifically, since the setting information obtained by the process of step S101 includes information indicating the currently selected antenna 311, the antenna controlling unit 334 generates and outputs a control signal to select the antenna 312. The media access controller 317 of the radio communication unit 218 receives this control signal, and then supplies the control signal to the baseband processor 316. The baseband processor 316 changes the diversity antenna changing switch 313 under control of the antenna switching control signal (the process of steps S62 to S64 in FIG. 10). Thereby, the switch is changed from one antenna 311 to the other antenna 312, for example.

The antenna is changed during time T1 (from time t3 to time t4) in FIG. 11. Specifically, the first packet #1 is received by the antenna 311. When it is determined that the antenna is to be changed, switching to the antenna 312 is performed during the period from time t3 to time t4. The second packet #2 is received by the antenna 312. Thus, one packet is received only by one antenna.

In step S108, the antenna change determining unit 331 determines whether the next packet has been received, and stands by until the antenna change determining unit 331 determines that the next packet has been received. Specifically, since an Ack of the first packet #1 was not able to be received, by the process of FIG. 7 by the base station 121, the second packet #2 (FIG. 11) is transmitted at a lower transmission rate (for example, step S14 in FIG. 7). By the process of FIG. 9 and FIG. 10 by the radio communication unit 218, received data, state information, and setting information of the packet #2 received via the antenna 312 are supplied to the host communication controlling unit 301. That is, the antenna change determining unit 331 stands by until time t7 in FIG. 11. Thus, since the host communication controlling unit 301 does not return the Ack to the base station 121 on the sender side, the base station 121 transmits the packet #2 at a lower transmission rate. That is, the Ack processing unit 332 can make a request to lower the transmission rate to the base station 121.

When the antenna change determining unit 331 determines in step S108 that the next packet (for example, the packet #2) has been received, the obtaining unit 330 in step S109 (shown in FIG. 13) obtains the received data, state information, and setting information corresponding to the selected antenna 312 from the media access controller 317. That is, the received data, the state information, and the setting information corresponding to an antenna different from the antenna corresponding to the received data, the state information, and the setting information obtained in step S101 described above are obtained. The obtaining unit 330 supplies the obtained state information to the antenna change determining unit 331.

In step S110, the antenna change determining unit 331 obtains a table item corresponding to the transmission rate included in the state information from the table storing unit 333. As described above, when an Ack is not received, the base station 121 on the sender side transmits the next packet at a lower transmission rate. Therefore, the transmission rate at this time will be lower than the transmission rate included in the state information obtained by the process of step S101 (or there is a possibility that the transmission rate at this time will be lower than the transmission rate included in the state information obtained by the process of step S101). When the transmission rate is 36 Mbps, for example, the antenna change determining unit 331 obtains the information shown in FIG. 6 indicating that a signal level in the range of −90 dBm to −20 dBm (−90 dBm or higher and −20 dBm or lower) gives a packet error rate of 0%. Incidentally, while in practice, the timing of returning the Ack to the base station 121 and the timing of transmitting the next packet from the base station 121 are different, such a process is basically performed.

In step S111, the antenna change determining unit 331 determines whether the received signal level included in the state information is in the range where the packet error rate is 0%, which range is obtained by the process of step S110. Specifically, the antenna change determining unit 331 determines whether the received signal level included in the state information is in the range of −90 dBm to −20 dBm. Specifically, when the received signal level is −50 dBm, the antenna change determining unit 331 determines that the received signal level is in the range where the packet error rate is 0%. When the received signal level is −10 dBm, the antenna change determining unit 331 determines that the received signal level is not in the range where the packet error rate is 0%. FIG. 15 is a diagram showing the ranges where the packet error rate is 0% when the transmission rate is 54 Mbps and 36 Mbps.

In FIG. 15, the abscissa represents the received signal level (dBm), and the ordinate represents the error rate (PER (Packet Error Rate)). A solid line in FIG. 15 shows the range where the packet error rate is 0% when the transmission rate is 54 Mbps, and a broken line shows the range where the packet error rate is 0% when the transmission rate is 36 Mbps. As shown in FIG. 15, a comparison between the ranges of the packet error rate of 0% when the transmission rate is 54 Mbps and 36 Mbps indicates that the range of the packet error rate of 0% is wider when the transmission rate is 36 Mbps. This indicates that a lower transmission rate decreases the probability of packet errors on the receiver side. That is, the base station 121 lowers the transmission rate when an Ack is not received in the process of FIG. 7 because it extends the range in which the packet error rate is 0%. Specifically, when the received signal level of the first packet #1 is −25 dBm and the transmission rate is 54 Mbps, it is determined that the received signal level is not in the range in which the packet error rate is 0%. However, when the received signal level of the second packet #2 is −25 dBm and the transmission rate is 36 Mbps, it is determined that the received signal level is in the range in which the packet error rate is 0%. In other words, the probability that the received signal level will not be in the range in which the packet error rate is 0% is decreased, and the probability that the received signal level will be in the range in which the packet error rate is 0% is increased.

Returning to FIG. 13, when the antenna change determining unit 331 determines in step S111 that the received signal level is not in the range in which the packet error rate is 0%, the antenna change determining unit 331 in step S112 determines whether the received signal level after the change of the antenna is closer to the range in which the packet error rate is 0%. For example, the antenna change determining unit 331 determines whether the received signal level after the change to the antenna 312 (the received signal level included in the state information obtained in step S109) is closer to the range in which the packet error rate is 0% than the received signal level of the antenna 311 before the change (the received signal level included in the state information obtained in step S101). It is determined as a result of the above-described process that the received signal levels of both the antenna 311 and the antenna 312 are not in the range in which the packet error rate is 0%. However, which of the two received signal levels is closer to the range in which the packet error rate is 0% is determined. When the received signal level corresponding to the antenna 311 is −100 dBm and the received signal level corresponding to the antenna 312 is −95 dBm, for example, it is determined that the antenna 312 is closer to the range in which the packet error rate is 0% (since the range in which the packet error rate is 0% is −90 dBm to −20 dBm, it is determined that the antenna 312 is closer to −90 dBm).

When the antenna change determining unit 331 in step S112 determines that the reception level after the change of the antenna is closer to the range in which the packet error rate is 0%, the antenna controlling unit 334 outputs an antenna maintaining control signal to the radio communication unit 218 in step S113.

When the antenna change determining unit 331 in step S112 determines that the reception level after the change of the antenna is not closer to the range in which the packet error rate is 0%, that is, the reception level before the change of the antenna is closer to the range in which the packet error rate is 0%, the antenna controlling unit 334 outputs an antenna switching control signal to the radio communication unit 218 in step S114. Specifically, since the setting information obtained by the process of step S109 includes information indicating the currently selected antenna 312, the antenna controlling unit 334 generates and outputs a control signal so as to select the antenna 311.

The media access controller 317 of the radio communication unit 218 receives the signal, and then supplies the signal to the baseband processor 316. The baseband processor 316 changes the diversity antenna changing switch 313 under control of the antenna switching control signal (the process of steps S62 to S64 in FIG. 10). Thereby, the switch is changed from the antenna 312 to the antenna 311, for example.

In this case, the antenna is changed during time T2 (from time t7 to time t8) in FIG. 11. Specifically, the second packet #2 is received by the antenna 312. When it is determined that the antenna is to be changed (when a result of the determination in step S112 is NO), switching back to the antenna 311 is performed during the period from time t7 to time t8. The third packet #3 is received by the antenna 311. Thus, the packet #1 and the packet #2 are received by the antenna 311 and the antenna 312, respectively. When both antennas are outside the range in which the packet error rate is 0%, switching to the antenna closer to the range in which the packet error rate is 0% is performed.

In step S108, the antenna change determining unit 331 determines whether the next packet has been received, and stands by until the antenna change determining unit 331 determines that the next packet has been received. That is, the antenna change determining unit 331 stands by until time t11 in FIG. 11.

After the process of step S113 or step S114, the process returns to step S108 to repeat the process from step S108 on down.

When the antenna change determining unit 331 determines in step S111 that the received signal level is in the range in which the packet error rate is 0%, the antenna controlling unit 334 in step S115 outputs an antenna maintaining control signal to the radio communication unit 218 (media access controller 317). The radio communication unit 218 receives this control signal (the process of step S65 in FIG. 10).

In step S116, the host communication controlling unit 301 performs a process based on the received data. That is, since the received signal level is in the range in which the packet error rate is 0%, the host communication controlling unit 301 performs a process based on the received data of the packet.

In step S117, the Ack processing unit 332 outputs an Ack to the media access controller 317 indicating that the data has been received. In response to this, each part of the radio communication unit 218 operates to transmit the Ack to the base station 121 on the sender side via the currently selected antenna (for example, the antenna 312) (the process of step S66 and step S67 in FIG. 10). The base station 121 on the sender side receives the Ack, and adjusts the transmission rate as described above (the process of step S12 and step S13 in FIG. 7). Then the process is ended.

The processes of FIG. 7, FIG. 9, FIG. 10, FIG. 12, and FIG. 13 are summarized as follows.

The radio communication unit 218 receives a radio wave transmitted from the base station 121 via one antenna, and obtains received data, state information, and setting information included in the packet. On the basis of a table describing a signal level range in which a packet error rate is 0% for each of a plurality of transmission rates, the host communication controlling unit 301 determines whether the received signal level of the antenna is within the range in which the packet error rate is 0% for the corresponding transmission rate. When the received signal level of the antenna is within the range in which the packet error rate is 0%, a next packet is received without the antenna being changed. When the received signal level of the antenna is outside the range in which the packet error rate is 0%, the host communication controlling unit 301 outputs an antenna switching control signal. The radio communication unit 218 receives a radio wave transmitted from the base station 121 via the other antenna, and obtains received data, state information, and setting information included in the packet. At this time, the base station 121 transmits the radio wave at a lower transmission rate because an Ack was not transmitted from the display apparatus 131.

On the basis of the table describing the range in which a packet error rate is 0% for the transmission rate of the received packet, the host communication controlling unit 301 determines whether the received signal level of the antenna is within the range in which the packet error rate is 0%. When the received signal level of the antenna is within the range in which the packet error rate is 0%, a next packet is received without the antenna being changed. When the received signal level of the antenna is outside the range in which the packet error rate is 0%, the host communication controlling unit 301 determines which of the received signal levels of the radio waves received by the first receiving antenna and the second receiving antenna is closer to the range in which the packet error rate is 0%. Then, even when the received signal level is outside the range in which the packet error rate is 0%, the antenna closer to the range in which the packet error rate is 0% is selected to perform reception. Because the base station 121 on the sender side transmits a radio wave at a transmission rate decreased sequentially when an Ack is not returned from the display apparatus 131 on the receiver side, the radio communication unit 218 receives the radio wave by the antenna closer to the range in which the packet error rate is 0%, and it is generally predicted that the antenna closer to the range in which the packet error rate is 0% will enter the range in which the packet error rate is 0% sooner, the host communication controlling unit 301 can change the diversity antenna changing switch 313 efficiently.

That is, when the level of a received signal received by one antenna is in the range in which the packet error rate is 0%, the host communication controlling unit 301 maintains the one antenna in the selected state without checking the received signal level of the other antenna, even if the received signal level of the other antenna is higher. When the signal level is outside the range in which the packet error rate is 0%, the host communication controlling unit 301 performs switching to the other antenna, and checks the received signal level of the other antenna.

Then, whether the antenna needs to be changed is determined on the basis of which of the received signal levels of the one antenna 311 and the other antenna 312 is closer to the range in which the packet error rate is 0%. When the other antenna 312 to which switching was performed is closer to the range in which the packet error rate is 0%, the antenna 312 is maintained in the selected state as it is. When the one antenna 311 before the switching is closer to the range in which the packet error rate is 0%, switching to the antenna 311 is performed. While the antenna 311 is already outside the range in which the packet error rate is 0%, the transmission rate is lowered on the sender side on the basis of an Ack or a control signal from the host communication controlling unit 301 (the sender side makes the determination, or the sender side is controlled by a rate decreasing request by the control signal from the host communication controlling unit 301). This is because the lowering of the transmission rate extends the range in which the packet error rate is 0% (see FIG. 15).

It is to be noted that while in the above-described example, a description has been made of a case where the present invention is applied to a radio system compliant with IEEE802.11a, the present invention is not limited to this. For example, the present invention is applicable to a radio system compliant with IEEE802.11b.

Figure 16:
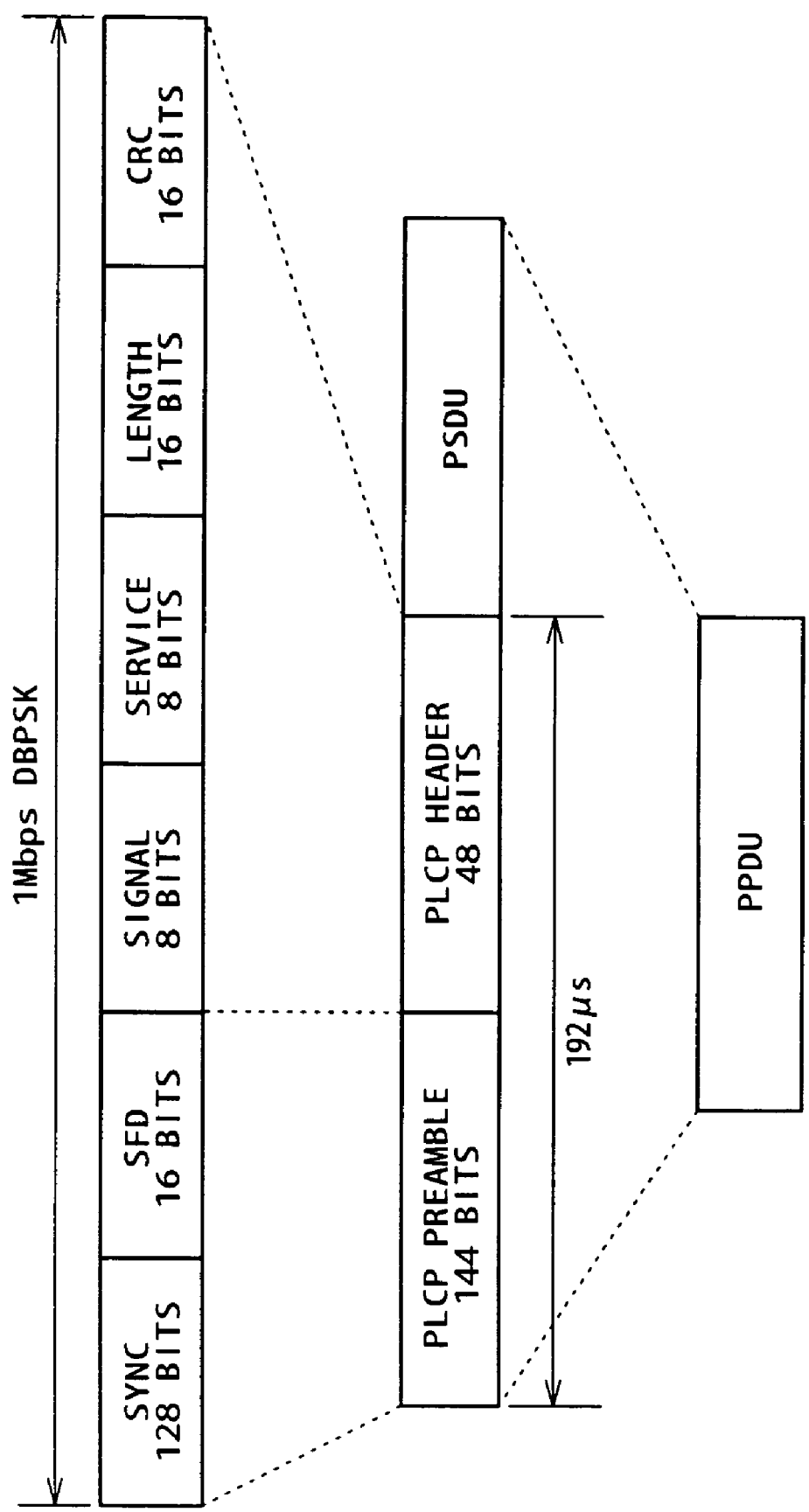
FIG. 16 is a diagram showing an example of the frame structure defined in IEEE802.11b.

FIG. 16 shows an example of a frame structure defined in IEEE802.11b.

As shown in FIG. 16, a frame includes a PLCL protocol data unit "PPDU" including a 144-bit "PLCP preamble" field, a 48-bit "PLCP header" field, and a "PSDU" field. The "PLCP preamble" field includes a 128-bit "SYNC" field for storing a signal for synchronization processing and a 16-bit "SFD" field indicating the start of the frame, that is, the start of an effective frame dependent on a physical layer. The "PLCP header" includes an 8-bit "SIGNAL" field indicating the transmission speed of a data part, an 8-bit "SERVICE" field for identifying a high speed modulation (CCK or PBCC), a 16-bit "LENGTH" field storing a time for transmitting the data part, and a 16-bit "CRC" field for cyclic redundancy check, which is one of error detection methods. The "PSDU" field stores 1-Mbps DBPSK (Differential Binary Phase Shift Keying) data. The combination of the "PLCP preamble" field and the "PLCP header" in FIG. 16 is referred to as a long preamble, which has a length of 192 μs. The present invention is applicable to such a frame structure.

As described above, only one packet is received by a selected antenna. Therefore, the need for checking received signal levels of each packet received by two antennas is eliminated, thus reducing the load on the device that controls the antennas. That is, diversity antennas can be controlled easily and optimally.

In addition, the antenna having a higher received signal level is not always selected, and antenna switching is not performed when the received signal level is in a range in which a packet error rate is 0%. Therefore, even when the received signal level becomes higher than a certain level, distortion on the receiver side can be prevented. That is, packet errors can be prevented.

Further, a received signal level and a transmission rate are checked in each packet received by one antenna, and only when the received signal level is outside the range in which a packet error rate is 0%, which range corresponds to the transmission rate, is switching to the other antenna performed and the received signal level of the other antenna checked. It therefore becomes unnecessary to increase the speed of the diversity antenna changing switch 313 to a level where the diversity antenna changing switch 313 is changed while one packet is received. It is thus possible to reduce cost.

In addition, since control of the diversity antenna changing switch 313 does not need to be performed at high speed as compared with the case where each packet is received by both antennas, the load on a control device can be reduced. Consequently, it is possible to extend the range of selections of parts and lower manufacturing cost.

Further, even when a preamble signal is a short signal, it suffices to check a received signal level for only one antenna between preamble signals. Therefore, it is possible to employ diversity antennas without concern for the length of preamble signals.

Incidentally, while in the above-described example, the base station 121 on the sender side lowers the transmission rate on the basis of an Ack from the receiver side, the receiver side may transmit a command to lower the transmission rate when the receiver side determines that the transmission rate needs to be lowered. That is, the Ack can be construed as a request to lower the transmission rate from the display apparatus 131 on the receiver side.

Further, in the foregoing example, a description has been made of a case where the present invention is applied to the radio communication unit 218 that controls the diversity antennas. However, the present invention is not limited to this, but may be applied to any receiving apparatus or communicating apparatus that controls diversity antennas. Furthermore, the base station 121 on the sender side may be any transmitting apparatus as long as the transmitting apparatus has the radio communication unit 193 controlling diversity antennas.

The series of processes described above can be carried out by software as well as hardware. When the series of processes is to be carried out by software, a program constituting the software is installed from a network or a recording medium.

As shown in FIG. 4, the recording medium is not only formed by a packaged medium including the removable medium 220 having the program recorded thereon and distributed to the user to provide the program separately from the apparatus proper, but also may be formed by the ROM 213, a hard disk including the flash memory 215, or the like having the program recorded therein and provided to the user in a state of being preincorporated in the apparatus proper.

It is to be noted that in the present specification, the steps describing the control program recorded on the recording medium include not only processes carried out in time series in the described order, but also processes carried out in parallel or individually and not necessarily in time series.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A receiving apparatus for receiving radio waves via first and second antennas, said receiving apparatus comprising:
   an obtaining unit operable to obtain a reception level of a first radio wave received via one antenna of the first and second antennas, and a transmission rate representing a transmission speed of the first radio wave, the transmission rate being included in the first radio wave and being set by a transmitting apparatus transmitting the first radio wave;
   a storing unit operable to store, for each of a predetermined plurality of transmission rates in which each respective transmission rate is different from each other transmission rate, a predetermined range of reception levels in which a packet error rate is substantially 0%;
   a determining unit operable to obtain a first range of reception levels from the storing unit which corresponds to the transmission rate of the first radio wave, to determine whether the reception level of the first radio wave is within the first range by comparing the reception level of the first radio wave to the reception levels in the first range obtained from the storing unit, and to determine whether to switch from the one antenna to another antenna based on a result of the determination as to whether the reception level of the first radio wave is within the first range; and
   a controlling unit operable to control switching of the antennas when the determining unit determines to switch from the one antenna to the another antenna so as to receive via the another antenna a second radio wave of a packet different from a packet of the first radio wave.

2. The receiving apparatus as claimed in claim 1, wherein the determining unit determines not to switch from the one antenna to the another antenna when the reception level of the first radio wave is within the first range of reception levels, and determines to switch from the one antenna to the another antenna when the reception level of the first radio wave is not within the first range of reception levels.

3. The receiving apparatus as claimed in claim 2, wherein, when the controlling unit controls switching to the another antenna, the obtaining unit obtains a reception level of the second radio wave received via the another antenna, and a transmission rate representing a transmission speed of the second radio wave, the transmission rate being included in the second radio wave and being set by the transmitting apparatus transmitting the second radio wave; and
   when the reception level of the second radio wave is not within a second range of reception levels stored in the storing unit which correspond to the transmission rate of the second radio wave, and when the reception level of the first radio wave is closer to the first range of reception levels than the reception level of the second radio wave is to the second range of reception levels, the determining unit determines to switch from the another antenna to the one antenna, and when the reception level of the first radio wave is not closer to the first range of reception levels than the reception level of the second radio wave is to the second range of reception levels, the determining unit determines not to switch from the another antenna to the one antenna.

4. The receiving apparatus as claimed in claim 1, further comprising a requesting unit operable to request the transmitting apparatus to lower a transmission rate representing a transmission speed of the second radio wave when the determining unit determines to switch from the one antenna to the another antenna.

5. The receiving apparatus as claimed in claim 1, wherein the predetermined plurality of transmission rates includes two or more of 6 Mbps, 9 Mbps, 12 Mbps, 18 Mbps, 24 Mbps, and 48 Mbps.

6. A method for receiving radio waves via first and second antennas, said receiving method comprising:
   obtaining a reception level of a first radio wave received via one antenna of the first and second antennas, and a transmission rate representing a transmission speed of the first radio wave, the transmission rate being included in the first radio wave and being set by a transmitting apparatus transmitting the first radio wave;

storing in a storing unit, for each of a predetermined plurality of transmission rates in which each respective transmission rate is different from each other transmission rate, a predetermined range of reception levels in which a packet error rate is substantially 0%;

obtaining a first range of reception levels from the storing unit which corresponds to the transmission rate of the first radio wave;

determining whether the reception level of the first radio wave is within the first range by comparing the reception level of the first radio wave to the reception levels in the first range obtained from the storing unit;

determining whether to switch from the one antenna to another antenna based on a result of the determination as to whether the reception level of the first radio wave is within the first range; and when it is determined to switch from the one antenna to the another antenna, controlling switching of the antennas so as to receive via the another antenna a second radio wave of a packet different from a packet of the first radio wave.

7. The method as claimed in claim 6, wherein the predetermined plurality of transmission rates includes two or more of 6 Mbps, 9 Mbps, 12 Mbps, 18 Mbps, 24 Mbps, and 48 Mbps.

8. A computer readable medium storing a program for controlling a process of receiving radio waves via first and second antennas and for causing a computer to perform the process, the program comprising:

obtaining a reception level of a first radio wave received via one antenna of the first and second antennas, and a transmission rate representing a transmission speed of the first radio wave, the transmission rate being included in the first radio wave and being set by a transmitting apparatus transmitting the first radio wave;

causing, for each of a predetermined plurality of transmission rates in which each respective transmission rate is different from each other transmission rate, a predetermined range of reception levels in which a packet error rate is substantially 0% to be stored in a storing unit;

obtaining a first range of reception levels from the storing unit which corresponds to the transmission rate of the first radio wave;

determining whether the reception level of the first radio wave is within the first range by comparing the reception level of the first radio wave to the reception levels in the first range obtained from the storing unit;

determining whether to switch from the one antenna to another antenna based on a result of the determination as to whether the reception level of the first radio wave is within the first range; and when it is determined to switch from the one antenna to the another antenna, controlling switching of the antennas so as to receive via the another antenna a second radio wave of a packet different from a packet of the first radio wave.

9. The medium as claimed in claim 8, wherein the predetermined plurality of transmission rates includes two or more of 6 Mbps, 9 Mbps, 12 Mbps, 18 Mbps, 24 Mbps, and 48 Mbps.

* * * * *